(12) United States Patent
Maeda

(10) Patent No.: US 7,453,606 B2
(45) Date of Patent: Nov. 18, 2008

(54) IMAGE COMMUNICATION APPARATUS AND METHOD

(75) Inventor: Toru Maeda, Mitaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 415 days.

(21) Appl. No.: 11/263,911

(22) Filed: Nov. 2, 2005

(65) Prior Publication Data

US 2006/0061821 A1    Mar. 23, 2006

Related U.S. Application Data

(62) Division of application No. 09/277,172, filed on Mar. 26, 1999, now Pat. No. 7,019,853.

(30) Foreign Application Priority Data

Apr. 10, 1998  (JP) .................. 10-099195
Apr. 10, 1998  (JP) .................. 10-099196

(51) Int. Cl.
*H04N 1/00* (2006.01)
*H04J 15/00* (2006.01)
*H04L 12/66* (2006.01)
*H04L 12/00* (2006.01)
*H04L 12/54* (2006.01)

(52) U.S. Cl. ............. 358/438; 358/435; 358/440; 358/425; 358/400; 358/406; 358/1.13; 358/1.15; 358/442; 358/407; 358/402; 379/100.12; 379/100.15; 379/93.09; 379/100.09; 379/100.13; 709/239; 340/2.1

(58) Field of Classification Search .............. 358/1.15, 358/402, 400, 407, 444, 434, 442, 468; 379/100.01, 379/100.09, 100.13, 100.03, 100.12, 93.07, 379/93.09, 93.24, 93.14, 93.15; 709/206, 709/207, 238, 239, 217; 370/61, 471, 473, 370/474, 428
See application file for complete search history.

(56) References Cited

U.S. PATENT DOCUMENTS 5,125,025 A   6/1992   Lim ........................... 379/100

(Continued)

FOREIGN PATENT DOCUMENTS

CN          1171007          1/1998

(Continued)

OTHER PUBLICATIONS

ITU-T Telecommunication Standardization Sector of ITU T.38 Series T: Terminals For Telematic Services. Procedures for real-time Group 3 facsimilie communication over IP networks.*

(Continued)

*Primary Examiner*—Twyler L. Haskins
*Assistant Examiner*—Chad Dickerson
(74) *Attorney, Agent, or Firm*—Fitzpatrick, Cella, Harper & Scinto

(57) ABSTRACT

An image communication apparatus having an Internet facsimile communication device and a G3 facsimile communication device includes a detector for detecting a facsimile function of a communication partner's apparatus during communication by the G3 facsimile communication device, and a controller for performing control of causing the G3 facsimile communication device to disconnect communication in a G3 facsimile mode and shifting to communication by the Internet facsimile communication device, based on the detection of the facsimile function of the communication partner's apparatus by the detector.

8 Claims, 19 Drawing Sheets

U.S. PATENT DOCUMENTS

| | | | | |
|---|---|---|---|---|
| 5,381,527 | A * | 1/1995 | Inniss et al. | 709/239 |
| 5,463,295 | A * | 10/1995 | Inde | 358/442 |
| 5,521,719 | A * | 5/1996 | Yamada | 358/438 |
| 5,568,280 | A * | 10/1996 | Wells et al. | 358/468 |
| 5,838,685 | A | 11/1998 | Hochman | 370/428 |
| 5,862,202 | A * | 1/1999 | Bashoura et al. | 379/100.14 |
| 5,872,845 | A | 2/1999 | Feder | 358/442 |
| 5,881,233 | A * | 3/1999 | Toyoda et al. | 709/233 |
| 5,933,584 | A * | 8/1999 | Maniwa | 358/1.15 |
| 5,999,598 | A * | 12/1999 | Henrick et al. | 379/93.07 |
| 6,005,677 | A * | 12/1999 | Suzuki | 358/442 |
| 6,058,169 | A * | 5/2000 | Bramnick et al. | 379/100.01 |
| 6,088,125 | A * | 7/2000 | Okada et al. | 358/405 |
| 6,137,597 | A | 10/2000 | Kanaya | 358/402 |
| 6,157,463 | A * | 12/2000 | Kitagawa | 358/400 |
| 6,172,763 | B1 * | 1/2001 | Toyoda et al. | 358/1.15 |
| 6,192,045 | B1 | 2/2001 | Williams et al. | 370/352 |
| 6,195,348 | B1 * | 2/2001 | Burkitt | 370/356 |
| 6,211,972 | B1 | 4/2001 | Okutomi et al. | 358/402 |
| 6,307,853 | B1 | 10/2001 | Storch et al. | 370/354 |
| 6,330,070 | B1 * | 12/2001 | Toyoda et al. | 358/1.15 |
| 6,335,966 | B1 * | 1/2002 | Toyoda | 358/442 |
| 6,339,481 | B1 * | 1/2002 | Scott | 358/442 |
| 6,374,291 | B1 | 4/2002 | Ishibashi et al. | 709/206 |
| 6,384,927 | B1 * | 5/2002 | Mori | 358/1.15 |
| 6,404,513 | B1 * | 6/2002 | Denker | 358/407 |
| 6,417,930 | B2 * | 7/2002 | Mori | 358/1.15 |
| 6,421,429 | B1 | 7/2002 | Merritt et al. | 379/93.17 |
| 6,437,873 | B1 * | 8/2002 | Maeda | 358/1.15 |
| 6,519,247 | B1 * | 2/2003 | Yoshida | 370/352 |
| 6,545,768 | B1 * | 4/2003 | Matsubara et al. | 358/1.15 |
| 6,690,480 | B2 | 2/2004 | Maeda | 358/1.15 |
| 6,700,674 | B1 * | 3/2004 | Otsuka et al. | 358/1.15 |
| 6,965,443 | B2 * | 11/2005 | Kato | 358/1.15 |
| 6,972,858 | B1 * | 12/2005 | Nishida et al. | 358/1.15 |
| 6,985,242 | B1 * | 1/2006 | Toyoda | 358/1.15 |
| 7,245,391 | B2 * | 7/2007 | Nishimura | 358/1.15 |

FOREIGN PATENT DOCUMENTS

| | | |
|---|---|---|
| EP | 0 812 100 A2 | 12/1997 |
| EP | 0 818 916 A2 | 1/1998 |
| EP | 0818916 | 1/1998 |
| EP | 0 818 916 A3 | 6/1999 |
| HK | 1005974 | 7/2004 |
| JP | 07288634 | 10/1995 |
| JP | 07336462 | 12/1995 |
| JP | 10028217 | 1/1998 |
| TW | 417386 | 1/2001 |
| WO | WO 97/10668 A1 | 3/1997 |

OTHER PUBLICATIONS

TSG-SA Working Group 1 (Services) meeting #2, Edinburgh, Scotland Mar. 9-12, 1999, ETSI SMG4. London, UK. Mar. 15-19, 1999.*

ITU-T Telecommunication Standardization Sector of ITU T.38 Series T: Terminals For Telematic Services. Procedures for real-time Group 3 facsimilie communication over IP networks.*

TSG-SA Working Group 1 (Services) meeting #2, Edinburgh, Scotland Mar. 9-12, 1999, ETSI SMG4. London, UK. Mar. 15-19, 1999.*

The MFP Solution. Hiroshi Endo, Tim Deppa, Yasumasa Shiraishi, Toshiyuki Ito. OKI Technical Review. Apr. 2003/Issue 194 vol. 70, No. 2. "http://www.oki.com/en/otr/194/downloads/otr-194-R15.pdf".*

Toyoda et al., "Simple Mode for Facsimilie Using Internet Mail" RFC Specifications RFC documents [2268-2366] Mar. 1, 1988, XP002156457.

Pat. Abstracts of Japan, JP 07 33462 A, vol. 1996, No. 4, Apr. 30, 1996.

Pat. Abstracts of Japan, JP 07 288634 A, vol. 1996, No. 2, Feb. 29, 1996.

K. Toyoda, et al., "Simple Mode of Facsimile Using Internet Mail", RFC Specifications RFC2305.TXT, Online!, Mar. 1, 1988.

* cited by examiner

FIG.2

| FRAME NAME | DESCRIPTION |
|---|---|
| CSE | CALLED SUBSCRIBER E-MAIL ADDRESS |
| CIE | CALLING SUBSCRIBER E-MAIL ADDRESS |
| TSE | TRANSMITTING SUBSCRIBER E-MAIL ADDRESS |

FIG.3

| ONE-TOUCH NUMBER | G3-FAX FUNCTION | TELEPHONE NUMBER | INTERNET FAX FUNCTION | INTERNET FAX ADDRESS | RECEIVER INFORMATION |
|---|---|---|---|---|---|
| 01 | PRESENT | 012-345-6789 | PRESENT | ifax1@canxx.co.jp | NONE |
| 02 | ABSENT | | PRESENT | ifax2@canxx.co.jp | A4, 200DPI, MH |
| 03 | PRESENT | 098-765-4321 | PRESENT | ifax3@canxx.com | B4, 400DPI, JBIG |
| 04 | PRESENT | 012-123-1234 | ABSENT | | |
| 05 | | | | | |
| 06 | | | | | |
| 07 | | | | | |

FIG.10

| DIS X BIT | DIS (X+1) BIT | DIS (X+2) BIT | DESCRIPTION |
|---|---|---|---|
| 0 | 0 | 0 | NO INTERNET FAX MODE |
| 0 | 0 | 1 | SIMPLE MODE |
| 0 | 1 | 0 | FULL MODE |
| 0 | 1 | 1 | SIMPLE MODE & FULL MODE |
| 1 | 0 | 0 | REALTIME MODE |
| 1 | 0 | 1 | REALTIME MODE & SIMPLE MODE |
| 1 | 1 | 0 | REALTIME MODE & FULL MODE |
| 1 | 1 | 1 | REALTIME MODE & SIMPLE MODE & FULL MODE |

FIG.11

| DCS X BIT | DCS (X+1) BIT | DCS (X+2) BIT | DESCRIPTION |
|---|---|---|---|
| 0 | 0 | 0 | NO INTERNET FAX MODE |
| 0 | 0 | 1 | SIMPLE MODE |
| 0 | 1 | 0 | FULL MODE |
| 1 | 0 | 0 | REALTIME MODE |

FIG.12

| FRAME NAME | DESCRIPTION |
|---|---|
| CSE | CALLED SUBSCRIBER E-MAIL ADDRESS |
| CIE | CALLING SUBSCRIBER E-MAIL ADDRESS |
| TSE | TRANSMITTING SUBSCRIBER E-MAIL ADDRESS |

FIG.14

| ONE-TOUCH NUMBER | G3-FAX FUNCTION | TELEPHONE NUMBER | INTERNET FAX FUNCTION | INTERNET FAX ADDRESS | ABBREVIATION OF COMMUNICATION PARTNER |
|---|---|---|---|---|---|
| 01 | PRESENT | 012 - 345 - 6789 | NONE | | CANO G3FAX |
| 02 | ABSENT | | SIMPLE | ifax@canxx.co.jp | CANO IFAX |
| 03 | PRESENT | 098 - 765 - 4321 | FULL | ifax@canxx.com | CANO G3/IFAX |
| 04 | | | REALTIME | rt.canxx.com | CANO IFAX-RT |
| 05 | | | | | |
| 06 | | | | | |
| 07 | | | | | |

IMAGE COMMUNICATION APPARATUS AND METHOD

CROSS REFERENCE TO RELATED APPLICATION

This application is a division of Ser. No. 09/277,172, filed Mar. 26, 1999, now U.S. Pat. No. 7,019,853, the entire disclosure of which is incorporated herein by reference.

BACKGROUND OF THE INVENTION

1. Field of the Invention

The present invention relates to an Internet facsimile (FAX) apparatus for transmitting/receiving an image by G3 FAX via a telephone network, and also transmitting/receiving an image by Internet FAX via Internet.

2. Description of the Related Art

Conventionally, an image can be transmitted/received by G3 FAX via a telephone network, and also can be transmitted/received by Internet FAX (a simple mode of Internet FAX) which does not require a communication fee by being subjected to LAN (local area network) connection to Internet.

In the simple mode, an A4-size and 200-dpi (dots per inch) image can be transmitted.

In the above-described conventional system, however, it is impossible to know the detailed functions of the communication partner's FAX apparatus in communication in the simple mode of Internet FAX.

Accordingly, the transmission side cannot know, for example, whether or not the apparatus at the reception side can use a B4-size recording sheet having a recording resolution of 400 dpi as the FAX function, and has a color reception function.

As a result, even if an original has been read with 400 dpi, the B4 size and in color at the transmission side, read image data can be transmitted only after being converting into 200 dpi and the A4 size.

Furthermore, in the above-described conventional system, it is impossible to know what type of Internet FAX mode is possessed by the apparatus at the reception side in communication in the G3 FAX mode.

In communication in the G3 FAX mode, it is also impossible to know whether or not the apparatus at the reception side as an Internet address.

Accordingly, it is impossible to switch from the G3 FAX mode to an appropriate mode from among Internet FAX modes which does not require a communication fee.

SUMMARY OF THE INVENTION

It is an object of the present invention to solve the above-described problems in the conventional system.

It is another object of the present invention to allow an apparatus having both the G3 FAX mode and the Internet FAX mode to notify the communication partner's apparatus of the FAX function of the transmitter's apparatus.

It is still another object of the present invention to allow an apparatus having both the G3 FAX mode and the Internet FAX mode to store the notified FAX function of the communication partner's apparatus so as to correspond to the address of the communication partner.

It is yet another object of the present invention to allow an apparatus having both the G3 FAX mode and the Internet FAX mode to form an image which is optimum for the FAX function of the communication partner's apparatus during Internet FAX transmission.

It is yet a further object of the present invention to provide an Internet FAX apparatus that can use a recording sheet of 400 dpi and the B4 size which represent a function superior to the function capable of being used in the simple mode of the Internet FAX and that can communicate image data using a color reception function, in the Internet FAX mode with free communication fee.

It is still another object of the present invention to provide an apparatus capable of notifying a communication partner's apparatus that the transmitter's apparatus has the Internet FAX mode, in the G3 FAX mode.

It is still another object of the present invention to provide an Internet FAX apparatus having the G3 FAX function and the Internet FAX function which can switch from the G3 FAX mode to an optimum mode from among Internet FAX modes which does not require a communication fee by notifying a communication partner's apparatus of the Internet address of the transmitter's apparatus in the G3 FAX mode.

According to one aspect of the present invention, a communication apparatus includes detection means for detecting a facsimile function of a communication partner's apparatus during communication by G3 facsimile communication means, and control means for performing control of causing the G3 facsimile communication means to disconnect communication in a G3 facsimile mode and shifting to communication by Internet facsimile communication means, based on the detection of the facsimile function of the communication partner's apparatus by the detection means.

According to another aspect of the present invention, a communication apparatus includes detection means for detecting a facsimile function of a communication partner's apparatus during communication by G3 facsimile communication means, and control means for causing Internet facsimile communication means to transmit an image in accordance with the facsimile function of the communication partner's apparatus detected by the detection means.

According to still another aspect of the present invention, a communication method includes the steps of detecting a facsimile function of a communication partner's apparatus during communication in a G3 facsimile mode, disconnecting communication in the G3 facsimile mode based on the detection of the facsimile function of the communication partner's apparatus, and shifting to communication in an Internet facsimile mode.

According to yet another aspect of the present invention, an image communication method having an Internet facsimile mode and a G3 facsimile mode includes the steps of detecting a facsimile function of a communication partner's apparatus during communication in the G3 facsimile mode, and transmitting an image in the Internet facsimile mode in accordance with the detected facsimile function of the communication partner's apparatus.

According to yet a further aspect of the present invention, an image communication apparatus having an Internet facsimile mode and a G3 facsimile mode includes function notification means for notifying a communication partner's apparatus that the image communication apparatus has an Internet facsimile function during communication in the G3 facsimile mode, and address notification means for notifying the communication partner's apparatus of an Internet facsimile address during the communication in the G3 facsimile mode.

According to still another aspect of the present invention, an image communication method having an Internet facsimile mode and a G3 facsimile mode includes the steps of notifying a communication partner's apparatus that a transmitter's apparatus has an Internet facsimile function during communication in the G3 facsimile mode, and notifying the communication partner's apparatus of an Internet facsimile address during the communication in the G3 facsimile mode.

According to still another aspect of the present invention, a communication apparatus includes detection means for detecting an Internet facsimile mode of a communication partner's apparatus during communication by G3 facsimile communication means, and control means for performing control of causing the G3 facsimile communication means to disconnect communication in a G3 facsimile mode and shifting to communication by Internet facsimile communication means, based on the detection of the Internet facsimile mode of the communication partner's apparatus by the detection means.

According to still another aspect of the present invention, a communication apparatus includes detection means for detecting an Internet facsimile mode of a communication partner's apparatus during communication by G3 facsimile communication means, and control means for causing Internet facsimile communication means to transmit an image in accordance with the Internet facsimile mode of the communication partner's apparatus detected by the detection means.

According to still another aspect of the present invention, a communication method includes the steps of detecting an Internet facsimile mode of a communication partner's apparatus during communication in a G3 facsimile mode, disconnecting the communication in the G3 facsimile mode and performing setting according to the detected Internet facsimile mode based on the detection of the Internet facsimile mode of the communication partner's apparatus, and shifting to Internet communication.

According to still another aspect of the present invention, a communication method having an Internet facsimile mode and a G3 facsimile mode includes the steps of detecting an Internet facsimile mode of a communication partner's apparatus during communication in the G3 facsimile mode, and transmitting an image in the Internet facsimile mode in accordance with the detected Internet facsimile mode of the communication partner's apparatus.

According to still another aspect of the present invention, an image communication apparatus having a plurality of Internet facsimile modes and a G3 facsimile mode includes mode notification means for notifying a communication partner's apparatus of an Internet facsimile mode possessed by the image communication apparatus during communication in the G3 facsimile mode, and address notification means for notifying the communication partner's apparatus of an Internet facsimile address during the communication in the G3 facsimile mode.

According to still another aspect of the present invention, an image communication method having a plurality of Internet facsimile modes and a G3 facsimile mode includes the steps of notifying a communication partner's apparatus of an Internet facsimile mode possessed by the transmitter's apparatus during communication in the G3 facsimile mode, and notifying the communication partner's apparatus of an Internet facsimile address during the communication in the G3 facsimile mode.

The foregoing and other objects, advantages and features of the present invention will become more apparent from the following detailed description of the preferred embodiments taken in conjunction with the accompanying drawings.

BRIEF DESCRIPTION OF THE DRAWINGS

FIG. 2 is a diagram illustrating optional signals, each for notifying an Internet address according to ITU-T (International Telecommunication Union-Telecommunication Standardization Sector) T30 recommendation in the first embodiment;

FIG. 3 is a diagram illustrating a format of address data in the first embodiment;

FIG. 10 is a diagram illustrating the format of a DIS signal according to the T30 recommendation in a second embodiment of the present invention;

FIG. 11 is a diagram illustrating the format of a DCS signal according to the T30 recommendation in the second embodiment;

FIG. 12 is a diagram illustrating optional signals, each for notifying an Internet address according to the T30 recommendation in the second embodiment;

FIG. 14 is a diagram illustrating a format of address data in the second embodiment;

DETAILED DESCRIPTION OF THE PREFERRED EMBODIMENTS

Preferred embodiments of the present invention will now be described with reference to the drawings.

First Embodiment

Figure 1:
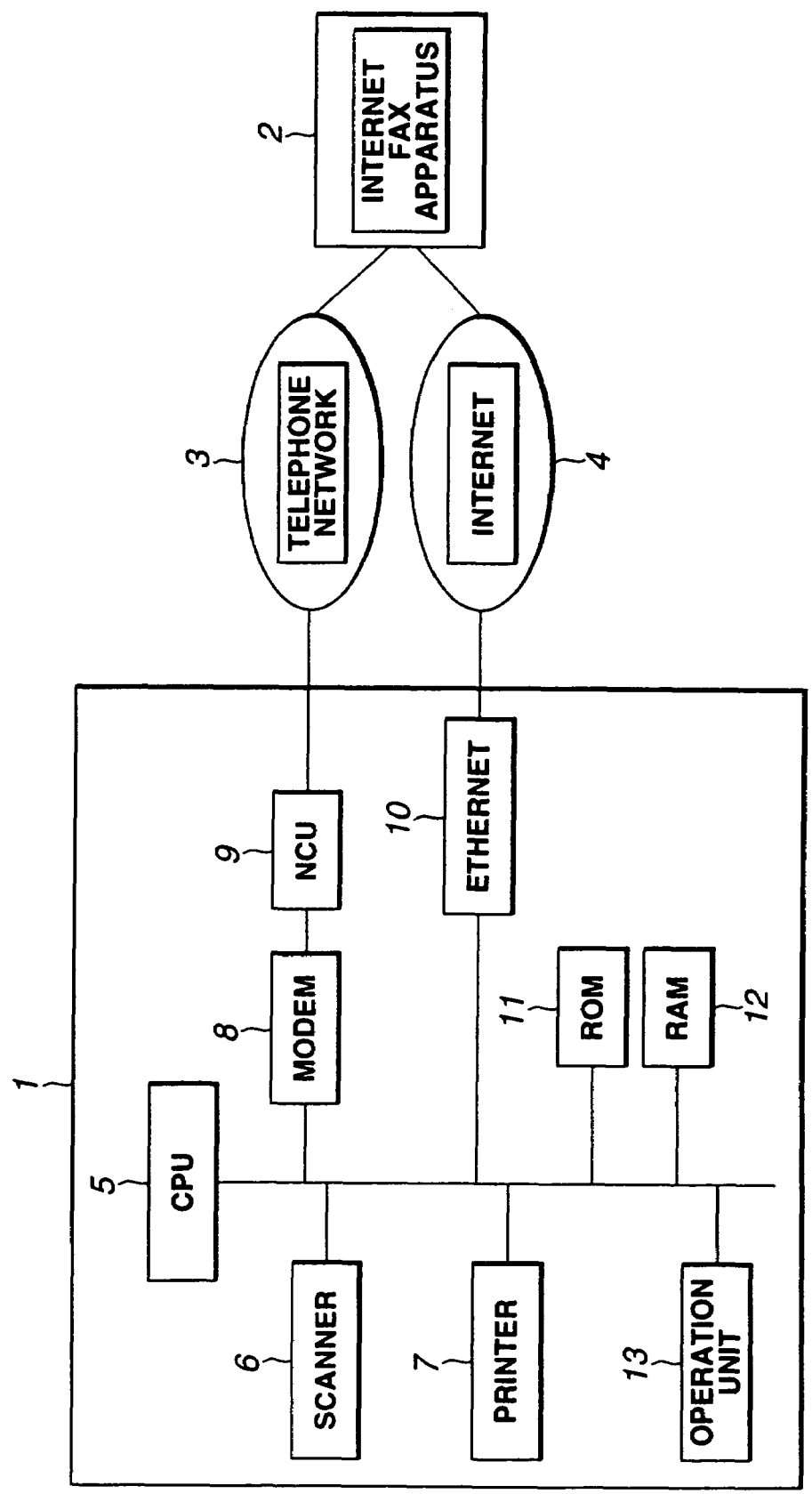
FIG. 1 is a block diagram illustrating the configuration of an Internet FAX apparatus according to a first embodiment of the present invention.

FIG. 1 is a block diagram illustrating image communication by an Internet FAX apparatus according to a first embodiment of the present invention.

In FIG. 1, an Internet FAX apparatus 1 operates at a side transmitting an image. An Internet FAX apparatus 2 operates at a side receiving the image. The internal structure of the Internet FAX apparatus 2 is not shown because it is the same as the internal structure of the Internet FAX apparatus 1.

A telephone network 3 is used for performing facsimile transmission. Reference numeral 4 represents Internet. In the first embodiment, the Internet 4 is used as a network for communicating E-mails.

A CPU (central processing unit) controls the Internet FAX apparatus 1. A scanner unit 6 reads an original and converts the read original into image data. A printer unit 7 prints an image represented by image data on a recording sheet as an image.

A FAX modem (modulator-demodulator) 8 performs communication in a G3 FAX mode, and modulates/demodulates a procedure signal and an image signal in G3 FAX. An NCU (network control unit) 9 is connected to the telephone network (telephone line) 3, and operates as an interface for call, call-receiving and analog signals.

An Ethernet interface 10 is connected to the Internet 4, and exchanges digital signals in the form of TCP (transmission control protocol)/IP(Internet protocol) packets.

A ROM (read-only memory) 11 stores control programs and control data for the Internet FAX apparatus 1 which are to be executed by the CPU 5. A RAM (random access memory) 12 is accessed by the CPU 5 when it executes the control programs, and is used by the CPU 5 as a working area, and stores control data and data relating to each address where an image is to be transmitted.

An operation unit 13 includes one-touch buttons to be used by the operator when instructing a transmission address.

The Internet FAX apparatus 1 in the first embodiment may include a scanner, a printer, a personal computer and the like which are interconnected via a network.

First, a description will be provided of basic two communication modes possessed by Internet FAX, i.e., a G3 FAX mode and an Internet FAX mode.

In the G3 FAX mode, an image is transmitted/received via the telephone network 3 in communication using the Internet FAX apparatus 1 (hereinafter termed a "transmitter 1") and the Internet FAX apparatus 2 (hereinafter termed a "receiver 2") shown in FIG. 1.

An outline of the user's operation, the operation of the transmitter 1, and the operation of the receiver 2 in communication in the G3 FAX mode will now be described.

The operator sets an original on the scanner unit 6 of the transmitter 1, and depresses an one-touch button on the operation unit 13.

The CPU 5 thereby reads address data (shown in FIG. 3) from the RAM 12 in accordance with an address instructed through the one-touch button. The CPU 5 selects one of the G3 FAX mode and the Internet FAX mode (in the first embodiment, it is assumed that the simple mode of Internet FAX is used) for transmitting image data, based on information registered in the address data.

When the G3 FAX mode has been selected, the CPU 5 reads the telephone number registered in address data of the address assigned through the one-touch button from the RAM 12. The CPU 5 then causes the NCU 9 to call the telephone number read from the RAM 12. The receiver 2 is thereby called via the telephone network 3.

Then, the image of the original is read by the scanner unit 6 of the transmitter 1. The read image of the original is converted into image data by the CPU 5 according to the control program (control software) stored in the ROM 11.

The receiver 2 called from the transmitter 1 starts automatic receiving processing according to an ordinary G3 FAX procedure.

In communication between the transmitter 1 and the receiver 2, first initial identification is performed according to an ITU-T T3 procedure. At that time, a procedure signal is modulated/demodulated by the modem 8, and is transmitted/received between the transmitter 1 and the receiver 2 via the telephone network 3.

Upon completion of the initial identification, the CPU 5 of the transmitter 1 encodes image data according to the control program (control software) stored in the ROM 11 and transmits encoded data. In the receiver 2, received image data is decoded, decoded data is transmitted to the printer, which prints a corresponding image.

Upon completion of transmission of the image data, the transmitter 1 transmits an end-of-procedure (EOP) signal.

When a confirmation signal (MCF signal) has been received from the receiver 2, the transmitter 1 transmits a disconnection signal (DCN signal) and terminates the communication in the G3 FAX mode.

A description will now be provided of the Internet FAX mode. In the Internet FAX mode (in the first embodiment, the simple mode of Internet FAX), an image is transmitted/received via the Internet 4 in communication using the transmitter 1 and the receiver 2 shown in FIG. 1.

In the simple mode, an image file in the form of TIFF (Tag Image Data Format) configured by image data of the A4 size and 200 dpi which has been encoded by an MH (modified Huffman) encoding method is transmitted by being added to an E-mail.

An outline of the operator's operation, the operation of the transmitter 1, and the operation of the receiver 2 in communication in the Internet FAX mode will now be described.

The operator sets an original on the scanner unit 6 of the transmitter 1, and depresses an one-touch button on the operation unit 13.

The CPU 5 thereby reads address data from the RAM 12 in accordance with an address instructed through the one-touch button. The CPU 5 selects one of the G3 FAX mode and the Internet FAX mode for transmitting image data, based on information registered in the address data.

When the Internet FAX mode has been selected, the CPU 5 reads an Internet address registered in the address data of the address instructed through the one-touch button from the RAM 12.

Then, the image of the original is read by the scanner unit 6 of the transmitter 1. The read image of the original is converted into image data by the CPU 5 according to the control program (control software) stored in the ROM 11.

The image data is converted into an additional file of the E-mail according to the control program (control software) stored in the ROM 11.

Upon completion of conversion of the image data into the additional file, the Internet address read from the RAM 12 is set as an address for the E-mail. The E-mail where the additional file of the image data is added is transmitted to the receiver 2 via Internet through Ethernet using SMTP (Simple Mail Transfer Protocol) which is a protocol for transmitting an E-mail.

The receiver 2 receives the E-mail according to the ordinary SMTP.

Upon reception of the E-mail, the receiver 2 detects if the additional file is added to the E-mail. When the additional file has been detected, then, it is determined if the additional file is image data.

If the result of the determination is affirmative, the additional file is converted into image data, which is transmitted to the printer in order to print an image represented by the image data.

As described above, in the Internet FAX apparatus, the G3 FAX mode and the Internet FAX mode, which are the two basic modes, operate.

A characteristic operation of the Internet FAX apparatus of the first embodiment will now be described with reference to FIGS. 2 through 7. In the first embodiment, it is proposed to add a new bit and a new optional frame to each of an initial identification signal, a reception command signal and a transmission command signal conforming to the ITU-T T30 recommendation.

FIG. 2 is a diagram illustrating an optional signal for notifying an Internet address according to the T30 recommendation. FIG. 3 is a diagram illustrating a format of address data.

Figure 4:
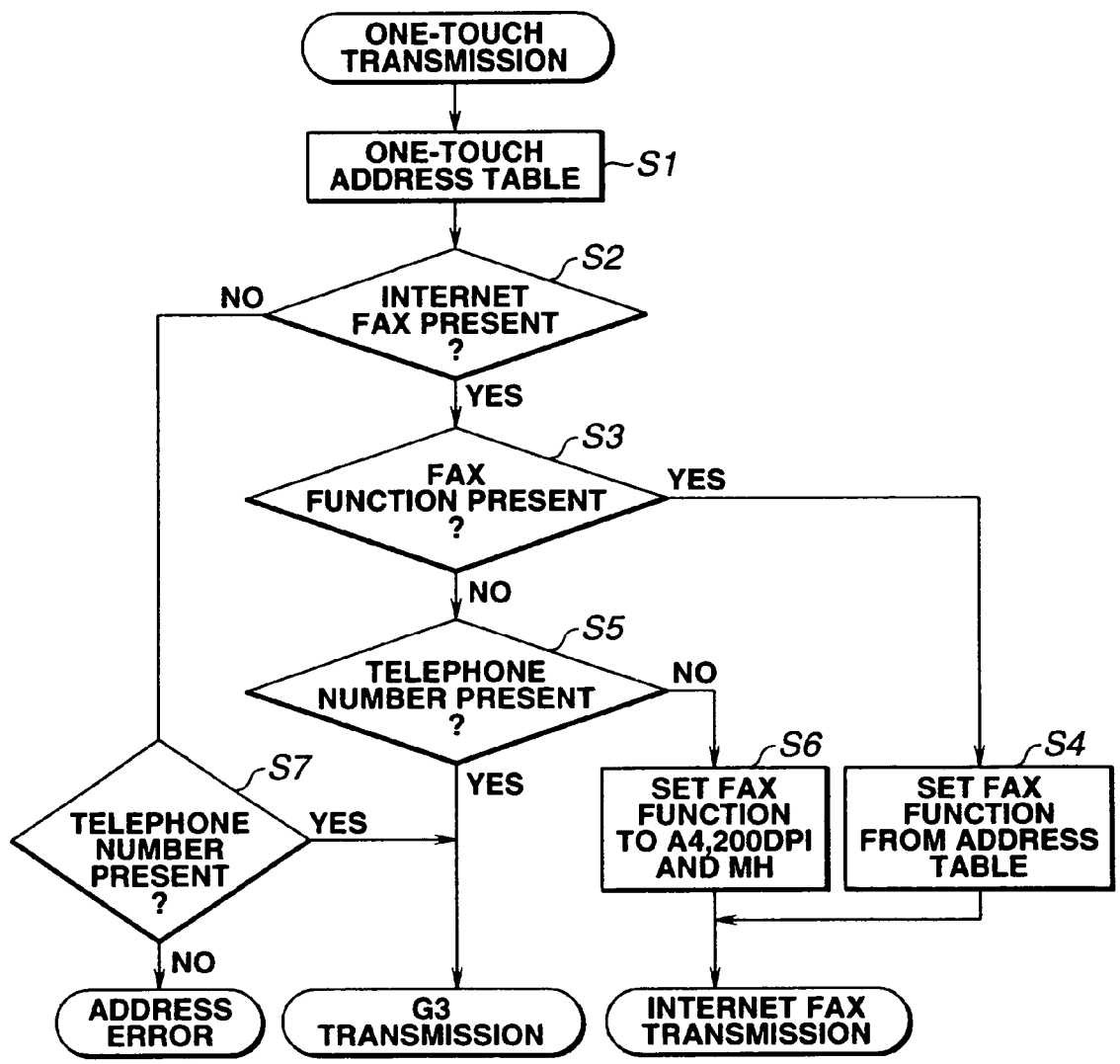
FIG. 4 is a flowchart illustrating one-touch transmission in the first embodiment.
Figure 5:
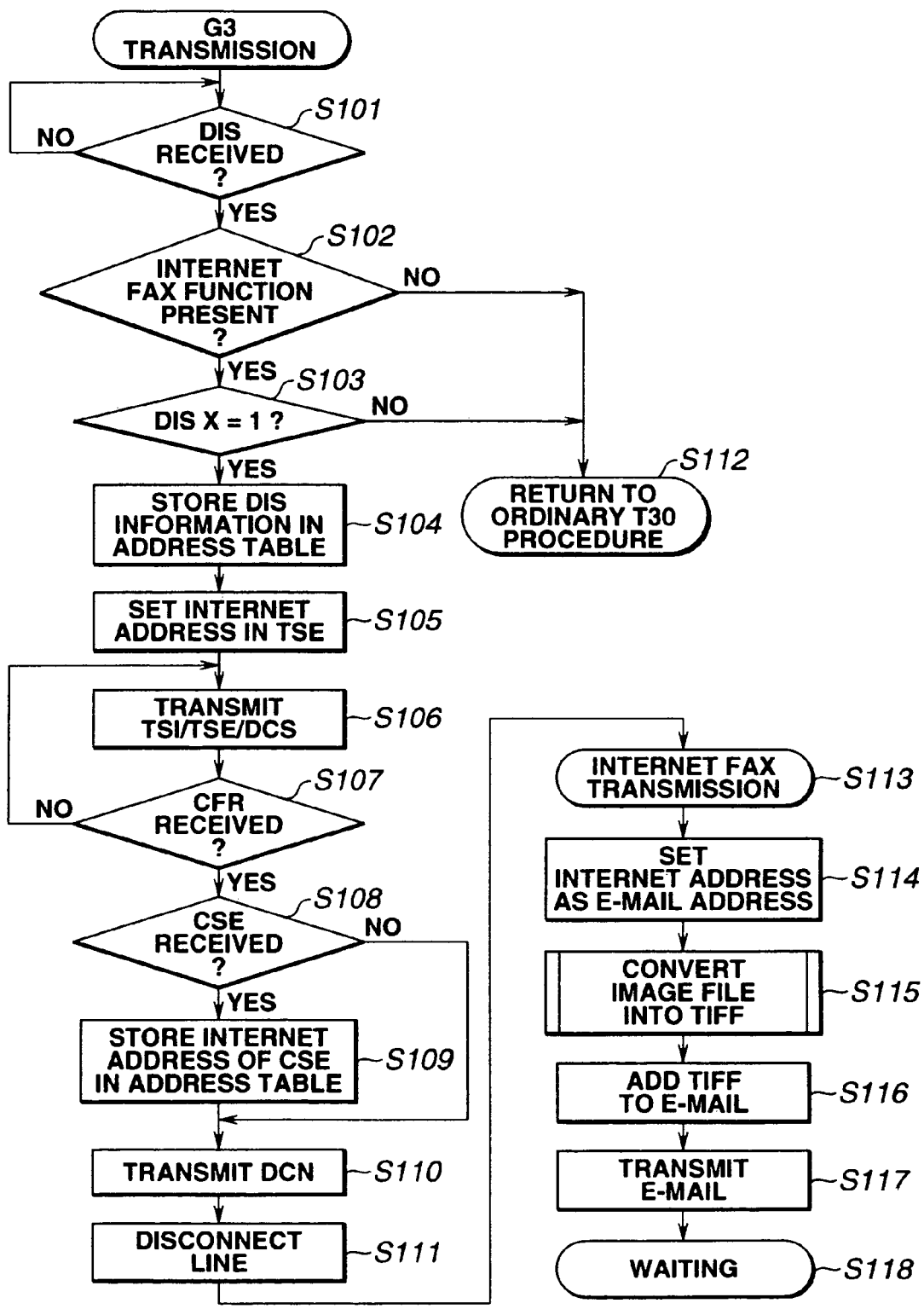
FIG. 5 is a flowchart illustrating Internet FAX transmission in the first embodiment.
Figure 6:
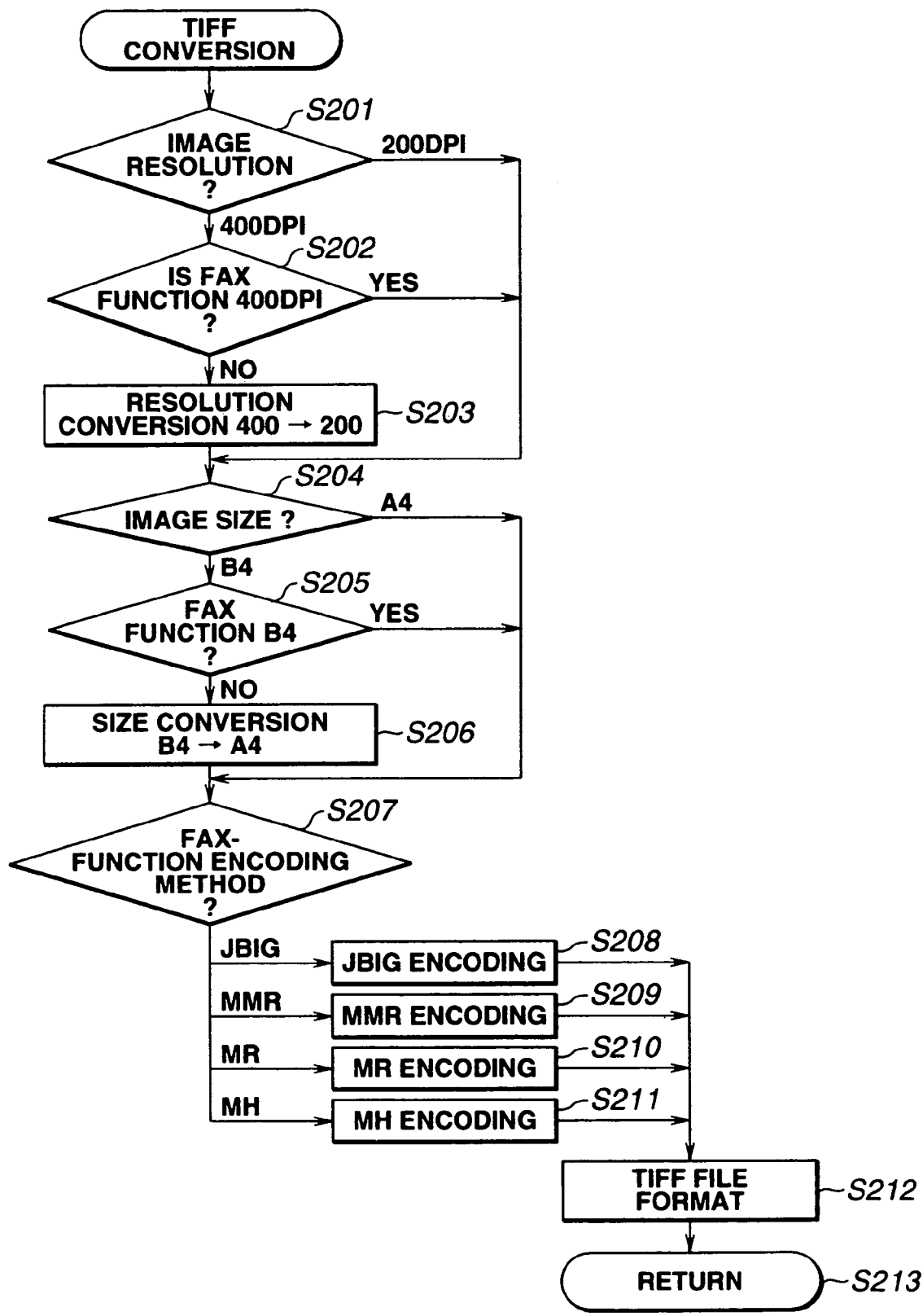
FIG. 6 is a flowchart illustrating TIFF (Tag Image Data Format) conversion in the first embodiment.
Figure 7:
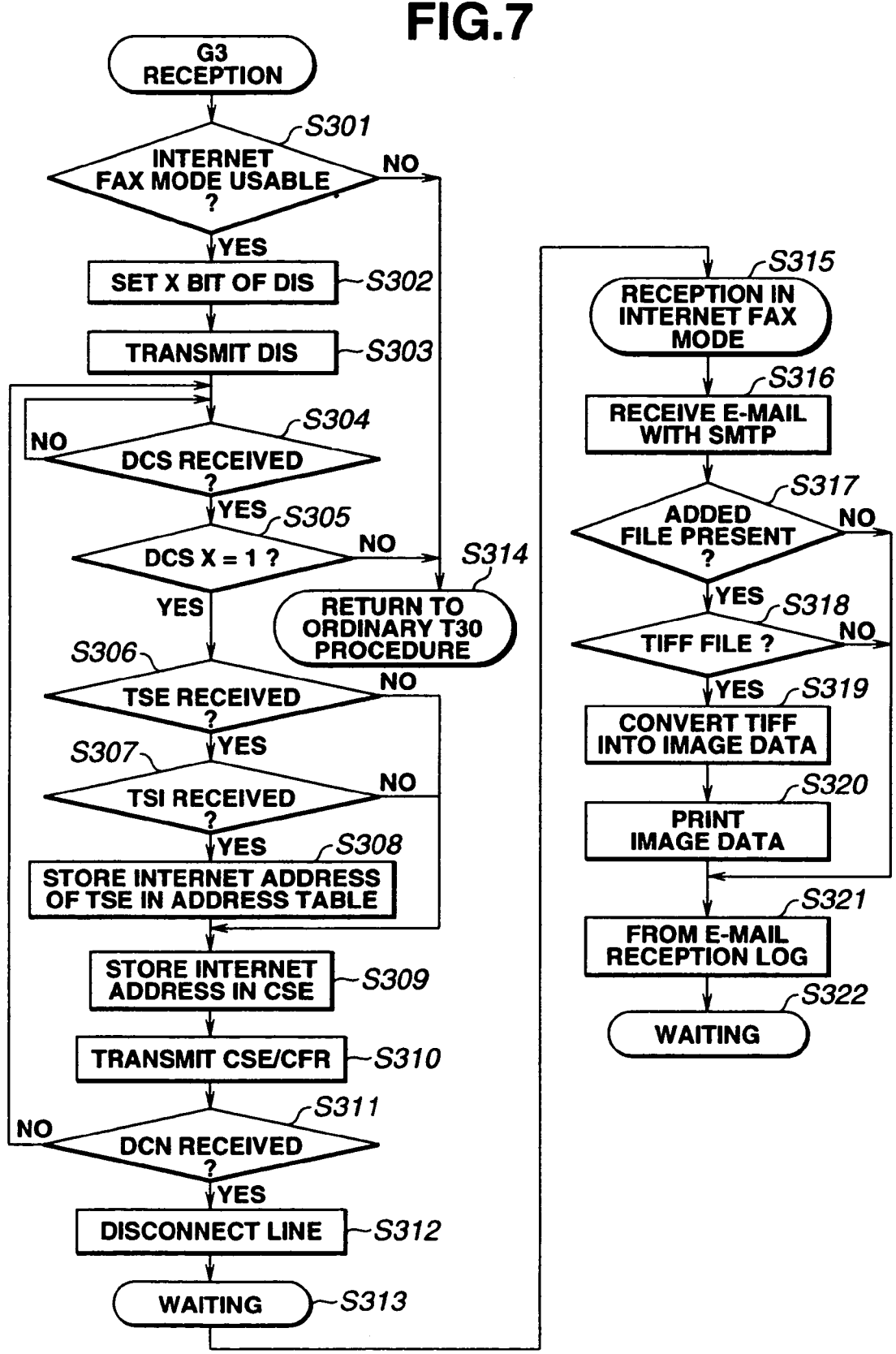
FIG. 7 is a flowchart illustrating Internet FAX reception in the first embodiment.

FIG. 4 is a flowchart illustrating one-touch transmission. FIG. 5 is a flowchart illustrating an image transmission operation of the Internet FAX apparatus 1. FIG. 6 is a flowchart illustrating TIFF conversion. FIG. 7 is a flowchart illustrating an image reception operation of the Internet FAX apparatus 2. Since the transmitter 1 and the receiver 2 have the same configuration, the receiver 2 will be described using the block diagram of the transmitter 1.

The contents of a DIS signal proposed in the first embodiment will now be described.

An octet (allocation of a bit of FIF) of the DIS signal is allocated according to ITU-T. In the first embodiment, it is assumed that a bit indicating the capability of Internet FAX is allocated to FIF of the DIS signal. A bit X indicates presence/absence of the Internet FAX function. That is, presence of the Internet FAX function in the receiver is represented by the bit X.

The contents of a DCS signal proposed in the first embodiment will now be described.

A bit X indicating whether or not the apparatus is to be switched to Internet FAX is allocated to FIF of the DCS signal. An octet (allocation of a bit of FIF) is allocated according to ITU-T. In the first embodiment, it is assumed that a bit indicating to perform communication by switching the communication mode from the G3 FAX mode to the Internet FAX mode is allocated to FIF of the DCS signal. A bit X indicates instruction to perform communication by switching the mode to the Internet FAX mode.

One bit or a plurality of bits may be allocated to the bit X.

It is assumed that, when a bit indicating presence/absence of the Internet FAX function is officially recommended by ITU-T, these bits X correspond to the recommended bits.

FIG. 2 is a diagram illustrating an optional signal for notifying an Internet address according to the T30 recommendation proposed in the first embodiment.

Conventionally, CSI, CIG and TSI signals are used as optional signals for notifying a telephone number in the T30 procedure. In the first embodiment, CSE, CIE and TSE signals corresponding to the CSI, CIG and TSI signals, respectively, are newly proposed and used as signals, each for notifying an Internet address. An Internet address is stored in FIF of each of the CSE, CIE and TSE signals.

As the CSI signal for transmitting a telephone number, the CSE signal, serving as an optional signal, is transmitted while storing the Internet address of the receiver in FIF of the frame. The timing of transmission of the CSE signal according to the T30 procedure is the same as the timing for the CSI signal.

As the CIG signal for transmitting a telephone number, the CIE signal, serving as an optional signal, is transmitted while storing the Internet address of the poling requesting apparatus in FIF of the frame. The timing of transmission of the CIE signal according to the T30 procedure is the same as the timing for the CIG signal.

As the TSI signal for transmitting a telephone number, the TSE signal, serving as an optional signal, is transmitted while storing the Internet address of the transmitter in FIF of the frame. The timing of transmission of the TSE signal according to the T30 procedure is the same as the timing for the TSI signal.

Figure 8:
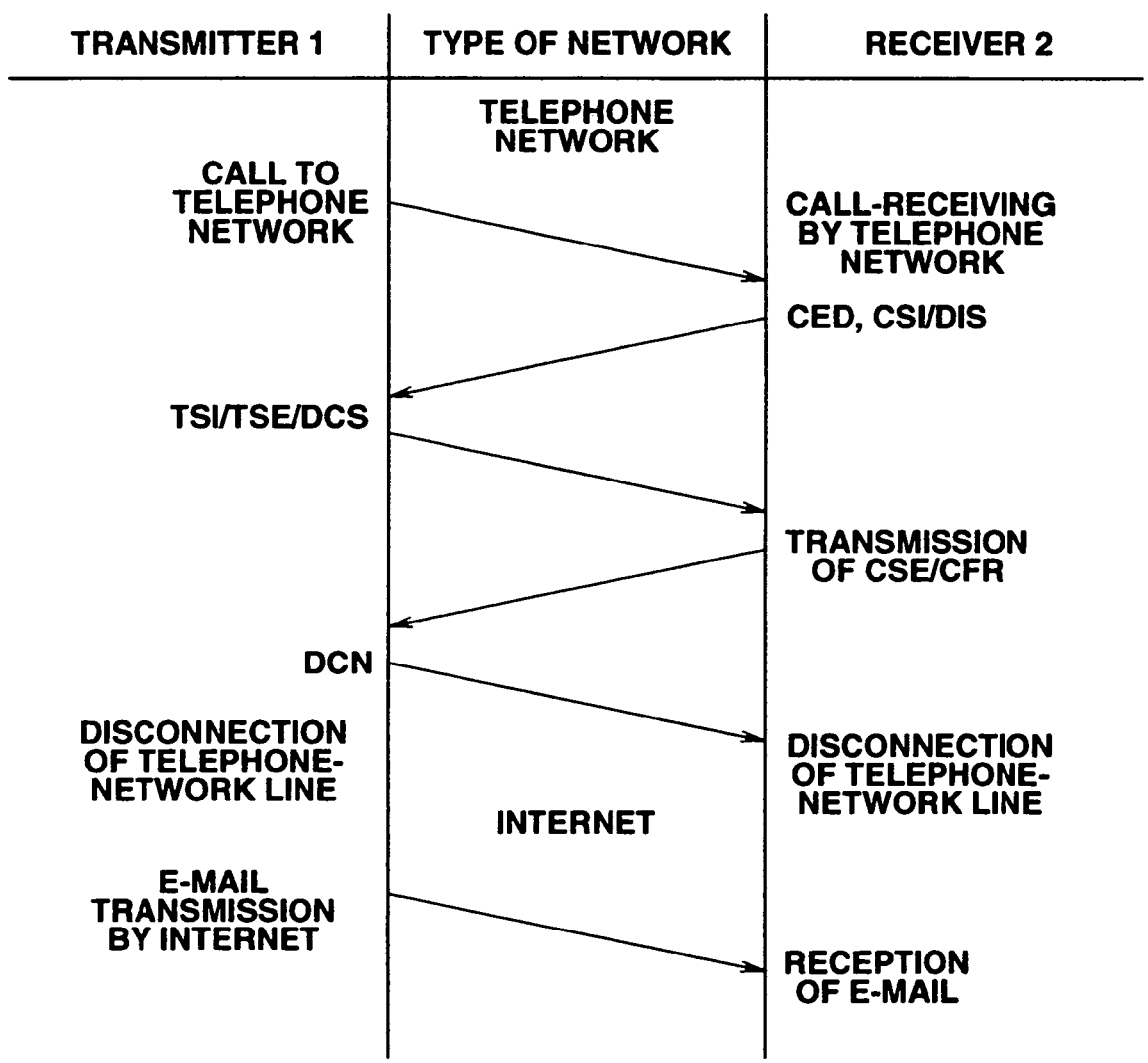
FIGS. 8 and 9 are diagrams, each illustrating a protocol in the first embodiment.

The manner of transmitting/receiving a signal in the G3 FAX mode in the first embodiment will now be desribed with reference to FIG. 8. Since this processing is performed basically according to the known T30 procedure, only difference from the known T30 procedure will be described.

First, the transmitter 1 calls the receiver 2 via the telephone network.

The receiver 2 which has received the call from the telephone network connects the line to the telephone network, and sets and transmits the X bit of DIS signal in accordance with the capability of the Internet FAX of the receiver's apparatus. At that time, the DIS signal notifies not only the function which can be used in the simple mode of Internet FAX, but also the function which cannot be used in the simple mode of Internet FAX.

Upon reception of the DIS signal from the receiver 2, the transmitter 1 determines if the Internet FAX mode is present in the receiver 2 according to the X bit of the DIS signal. If the result of the determination is affirmative, the communication mode is determined according to the flowchart for selecting the communication mode shown in FIG. 4 (to be described in detail later). When the Internet FAX mode has been selected, an instruction to switch to the Internet FAX mode is set in the X bit of the DCS signal, the Internet address of the transmitter 1 is set in the optional frame TSE, and the resultant signal is transmitted. The function which cannot be notified in the simple mode of Internet FAX and which has been notified by the received DIS signal is stored in address data.

Upon reception of the DSC signal, the receiver 2 determines if shift to the Internet FAX mode is instructed according to the X bit of the DCS signal. If the result of the determination is affirmative, a CFR signal is transmitted, the Internet address of the receiver's apparatus is stored in the optional frame CSE, and the resultant signal is transmitted.

Upon reception of the CFR signal after transmitting the DCS signal, the transmitter 1 transmits a DCN signal in order to shift to the Internet FAX mode, and terminates the communication via the telephone network by disconnecting the line.

The receiver 2 disconnects the line upon reception of the DCN signal.

Then, the transmitter 1 shifts to the Internet FAX mode, and transmits an E-mail where an image data file in the form of TIFF is added.

The receiver 2 converts the image data file added to the E-mail received via Internet into printing data, and records an image represented by the image data on a recording sheet.

Figure 9:
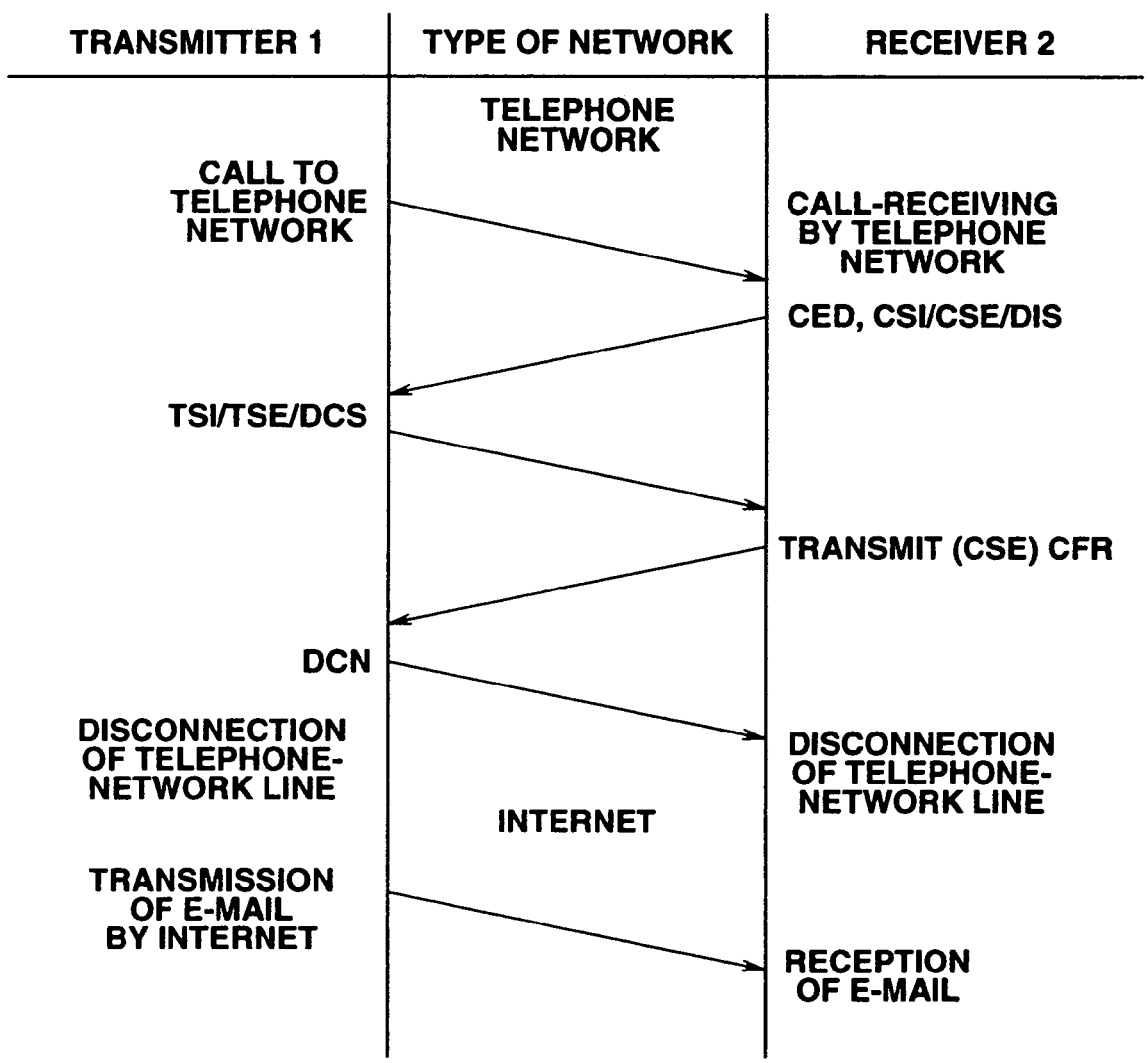

The optional frame CSE transmitted from the receiver 2 may be transmitted together with the DIS signal. In this case, the CSE signal after receiving the DCS signal may or may not be transmitted (see FIG. 9).

FIG. 3 illustrates a format of address data. Each of the address data is provided for the corresponding one of a plurality of one-touch dials or abbreviation dials, and an address table including a plurality of address data is stored in the RAM 12 shown in FIG. 1. One-touch-dial numbers and abbreviation-dial numbers are generically termed "one-touch numbers".

In FIG. 3, presence/absence of the G3 FAX mode (G3 FAX function), the telephone number, presence/absence of the Internet FAX mode (Internet FAX function), the Internet address, and information relating to the receiver for each one-touch number are stored in the RAM 12.

The procedure of one-touch transmission of Internet FAX will now be described with reference to the flowchart shown in FIG. 4. The flowchart shown in FIG. 4 is a program stored in the ROM 11, and is executed by the CPU 5.

When a one-touch dial button on the operation unit 13 has been depressed, information (presence/absence of the G3 FAX mode, the telephone number, presence/absence of the Internet FAX mode, and the Internet address) relating to the one-touch number corresponding to the depressed button is read.

When the one-touch dial button has been depressed (input) by the operator, then, in step S1, information relating to address data of the one-touch number corresponding to the depressed one-touch dial button is read.

In step S2, it is determined if the Internet FAX mode is present in the input address. If the result of the determination in step S2 is affirmative, the process proceeds to step S3. If the result of the determination in step S2 is negative, the process proceeds to step S7, where it is determined if the telephone number is set in the address table. If the result of the determination in step S7 is affirmative, transmission is performed in the G3 FAX mode. If the result of the determination in step S7 is negative, address error processing is performed assuming that address error has occurred.

In step S3, it is determined if information relating to the function of the receiver (receiving-function information) is written in the address data. If the result of the determination in step S3 is affirmative, the process proceeds to step S4, where the receiving-function information is read from the address data and is set for transmission in the Internet FAX mode. Then, transmission in the Internet FAX mode is executed.

If the result of the determination in step S3 is negative, the process proceeds to step S5, where it is determined if the telephone number is written. If the result of the determination in step S5 is affirmative, a G3 FAX transmission mode is selected, and communication for receiving the receiving-function information from the receiver 2 is executed.

If the result of the determination in step S5 is negative, the process proceeds to step S6, where the A4 size, 200 dpi and the MH encoding method are set as the receiving-function information, and transmission is performed in the Internet FAX mode.

The flow at the transmission side Internet FAX apparatus will now be described with reference to FIG. 5. The flowchart shown in FIG. 5 is a program stored in the ROM 11 and executed by the CPU 5.

Suppose that the operator has set an original and has depressed a one-touch button 01 on the operation unit 13. According to the flow of one-touch transmission shown in FIG. 4, the CPU 5 checks address data of the address 01 shown in FIG. 3, and determines that the Internet FAX function is present, receiving-function information is not stored in the memory, and the telephone number is registered. The address 01 is called via the telephone network based on this information, and communication in the G3 FAX mode is started.

After the call, in step S101, a DIS signal is received from the receiver 2.

In step S102, it is determined if the Internet FAX function is present in the transmitter's apparatus. If the result of the determination in step S102 is affirmative, the process proceeds to step S103. If the result of the determination in step S102 is negative, the process proceeds to step S112, where image data is transmitted in the G3 FAX mode according to the ordinary T30 procedure.

In step S103, it is determined if the Internet FAX mode is present in the received DIS signal. If the result of the determination in step S103 is affirmative, the process proceds to step S104. If the result of the determination in step S103 is negative, the process proceeds to step S112. In step S104, received information relating to the receiver 2, for example, DIS information indicating the B4 size, 400 dpi and JBIG, is stored in the column of address data for the one-touch number 01 shown in FIG. 3.

In step S105, the Internet address of the transmitter's apparatus is set in the TSE signal.

Then, in step S106, TSI, TSE and DCS signals are transmitted. When a CFR signal has been received in step S107 after transmitting the TSI, TSE and DCS signals, then, in step S108, it is determined if a CSE signal has been received. If the result of the determination in step S108 is affirmative, the process proceeds to step S109. If the result of the determination in step S108 is negative, the process proceeds to step S110.

In step S109, the Internet address in FIF of the CSE signal is stored in a working area of the RAM 12 and is set in the Internet address of the corresponding one-touch number in the address table.

Then, in step S110, a DCN signal is transmitted. Then, in step S111, the NCU 9 disconnects the line.

Then, in step S113, transmission processing in the Internet FAX mode is started.

Then, in step S114, the Internet address of the receiver 2 stored in the working area in step S109 is set as the address for the E-mail.

Then, in step S115, the image data file is converted into TIFF. At that time, for example, TIFF comprising the B4 size, 400 dpi and JBIG is formed for the image to be transmitted according to the flow of TIFF conversion shown in FIG. 6.

In step S116, the image data file converted in the form of TIFF is added to the E-mail. Then, in step S117, the. E-mail is transmitted with SMTP. Then, in step S118, the process returns to a waiting state.

The flow of TIFF conversion will now be described with reference to FIG. 6. The flowchart shown in FIG. 6 is a program stored in the ROM 11 and executed by the CPU 5.

First, in step S201, the resolution of the image to be transmitted is checked. If the resolution is 400 dpi, the process proceeds to step S202. If the resolution is 200 dpi, the process proceeds to step S204.

In step S202, it id determined if 400 dpi is present in the receiving-function information relating to the address data of the one-touch number depressed by the operator. If the result of the determination in step S202 is affirmative, the process proceeds to step S204. If the result of the determination in step S202 is negative, the process proceeds to step S203, where the resolution conversion into 200 dpi is performed.

In step S204, the size of the image to be transmitted is checked. If the size is B4, the process proceeds to step S205. If the size is A4, the process proceeds to step S207.

In step S205, it is determined if B4 is present in the receiving-function information relating to the address data of the one-touch number depressed by the operator. If the result of the determination in step S205 is affirmative, the process proceeds to step S207. If the result of the determination in step S205 is negative, the process proceeds to step S206, where the size is converted into A4.

In step S207, the encoding method of the receiving-function information relating to the address data of the one-touch number depressed by the operator is checked, and encoding is performed according to the JBIG, MMR, MR or MH method.

In step S212, image data encoded in each of steps S208-S211 is converted into a file in the form of TIFF.

The flow at the reception-side Internet FAX apparatus will now be described with reference to FIG. 7. The flowchart shown in FIG. 7 is a program stored in the ROM 11 and executed by the CPU 5 when the Internet FAX apparatus operates as a reception-side apparatus.

When there is a call from the telephone network, the NCU 9 performs call-receiving processing, and an automatic reception procedure in the G3 FAX mode is started.

In step S301, it is determined if the Internet FAX mode of the receiver's apparatus is set to be usable. If the result of the determination in step S301 is affirmative, the process proceeds to step S302. If the result of the determination in step S301 is negative, the process proceeds to step S314, where the process returns to the ordinary T30 procedure.

In step S302, the X bit of the DIS signal is set in accordance with the setting of the Internet FAX function of the receiver's apparatus. Then, in step S303, a DIS signal is transmitted.

In step S304, it is determined if a DCS signal has been received. If the result of the determination in step S304 is affirmative, the process proceeds to step S305, where it is determined if the X bit of the DCS signal equals 1. If the result of the determination in step S305 is negative, i.e., if the X bit of the DCS signal equals 0, the process proceeds to step S314, where the process returns to the ordinar T30 procedure.

In step S306, it is determined if a TSE signal has been received. If the result of the determination in step S306 is affirmative, the process proceeds to step S307, where it is determined if a TSI signal has been received. If the result of the determination in step S307 is affirmative, the process proceeds to step S308, where the Internet address in the TSE signal is stored in the column of the Internet address of address data corresponding to the telephone number in the TSI signal.

Then, in step S309, the Internet address of the receiver's apparatus is stored in a CSE signal. In step S310, CSE and CFR signals are transmitted. Then, in step S311, it is determined if a DCN signal has been received. If the result of the determination in step S311 is negative, the process returns to step S304.

If the result of the determination in step S311 is affirmative, the process proceeds to step S312, where the NCU 9 disconnects the line. Then, the process returns to the waiting state in step S313.

When the process has returned to the waiting state, image data is transmitted from the transmitter in the Internet FAX mode, and the process proceeds to step S315, where reception in the Internet FAX mode is started.

Then, in step S316, reception of the E-mail is performed with SMTP.

In step S317, it is determined if an additional file is present in the E-mail. If the result of the determination in step S317 is affirmative, the process proceeds to step S318, where it is determined if the additional file is a TIFF file.

If the result of the determination in step S318 is affirmative, the process proceeds to step S319. If the result of the determination in step S317 or S318 is negative, the process proceeds to step S321.

In step S319, the TIFF file is converted into image data. In step S320, an image represented by the image data is printed by the printer.

In step S321, an E-mail reception log is formed. Then, the process returns to the waiting state in step S322.

In the simple mode, serving as the ordinary Internet FAX mode, only a TIFF file indicating the A4 size, 200 dpi and the MH encoding method is received. According to the first embodiment, however, the transmitter 1 can transmit a TIFF file indicating the B4 size, 400 dpi and JBIG so as to correspond to the receiving function of the receiver 2, when the function of the receiver 2 is stored, or after receiving receiving-information information relating to the receiver 2 in the G3 FAX mode when the function of the receiver 2 is not stored.

The receiver 2 can assuredly convert image data of the B4 size, 400 dpi and JBIG transmitted so as to correspond to the function of the receiver 2 into image data for printing, and can also assuredly perform printing even if image data using a function other than the function usable in the simple mode of Internet FAX is received.

As described above, in the first embodiment, the Internet FAX function of the receiver is notified to the transmitter using a DIS signal, and the Internet address of the receiver is transmitted using an optional CSE signal. The transmitter instructs communication in the Internet FAX mode with a DCS signal, interrupts the G3 FAX mode, and execute communication in the Internet FAX mode. Hence, it is possible to transmit image data adjusted to the function of the receiver which cannot be transmitted in the simple mode of Internet FAX via Internet.

Modification of the First Embodiment

In the above-described first embodiment, the mode is switched to the Internet FAX mode by interrupting the T30 procedure. However, it is also possible to transmit image data in the G3 FAX mode at the first communication operation with a communication partner, and transmit image data at subsequent communication operations by directly selecting the Internet FAX mode using the same one-touch number.

It is determined that the current communication with an address in the Internet FAX mode is the first communication operation when receiving-function information is not stored as in the case of the one-touch number 01 shown in FIG. 1, when the Internet FAX function is absent as in the case of the one-touch number 04, when the Internet FAX address is not stored, or when at least one of the above-described conditions is satisfied.

In the first communication operation with a communication partner, the G3 facsimile transmission mode is selected according to the determination shown in FIG. 4 in the first embodiment.

The flow shown in FIG. 5 for the first embodiment differs for the modification in the first communication operation. Only difference from the first embodiment will now be described, and description for the same processing will be omitted.

After NO in step S108 or after execution of step S109 shown in FIG. 5, ordinary T30 image data transmission is performed (image data is transmitted after trasmitting a training/TCF signal and receiving a CFR signal from the receiver 2). After transmitting image data for all pages in that communication operation, an ordinary T30 EOM signal is transmitted. Then, the process proceeds to step S110, where a DCN signal is transmitted. Then, the first communication operation with the communication partner is terminated.

In each of subsequent communication operations with the communication partner, as shown in FIG. 4, address data of the address in the one-touch address table is read. Then, the process proceeds as YES in step S2 and YES in step S3. In step S4, receiving-function information relating to address data corresponding to the address stored in the address table is set, and then, transmission in the Internet FAX mode is selected. Then, image data is transmitted via Internet according to the processing from step S113 to step S118 shown in FIG. 5.

It is also possible to transmit image data stored in the memory during memory transmission in the Internet FAX mode as in the first embodiment.

When performing a call using a ten-digit key dial instead of a one-touch key, it is also possible to transmit image data in the Internet FAX mode as in the first embodiment by storing the FAX function of the receiver received in the G3 FAX mode together with the telephone number called using the ten-digit key dial in a working area of the RAM 12.

According to the first embodiment, in an image communication apparatus and method having the Internet FAX mode and the G3 FAX mode, the FAX function of the communication partner's apparatus is detected during communication in the G3 FAX mode, and the apparatus shifts to communication in the Internet FAX mode by disconnecting communication in the G3 FAX mode based on detection of the FAX function of the communication partner's apparatus. Thus, the apparatus shifts to the Internet FAX mode requiring no communication fee after knowing the function of the communication partner's apparatus in communication in the G3 FAX mode. As a result, it is possible to reduce the communication cost, and transmit optimum image data in accordance with the function of the communication partner's apparatus. Furthermore, the FAX function of the communication partner's apparatus is detected during communication in the G3 FAX mode, and an image is transmitted in the Internet FAX mode in accordance with the detected function of the communication partner's apparatus. Hence, it is possible to detect the function of the communication partner's apparatus in the G3 FAX mode even if the Internet FAX function of the communication partner's apparatus is unknown, and to transmit optimum image data in accordance with the function of the communication partner's apparatus in the Internet FAX mode.

According to the first embodiment, the detected FAX function of the communication partner's apparatus is stored, and image data is transmitted in the Internet FAX function in accordance with the stored FAX function of the communication partner's apparatus. Hence, when the function of the communication partner's apparatus is stored, it is possible to start to transmit optimum image data adjusted to the function of the communication partner's apparatus in the Internet FAX mode without performing communication in the G3 FAX mode, and therefore to start communication of image data earlier by an amount of omitting the G3 FAX mode for detecting the function of the communication partner's apparatus, and to reduce the communication fee.

According to the first embodiment, in an image communication apparatus and method having the Internet FAX mode and the G3 FAX mode, the apparatus notifies the communication partner's apparatus of possession of the Internet FAX function, and the Internet FAX address during communication in the G3 FAX mode. Hence, even when the communication partner's apparatus does not know the possession of the Internet FAX function and the Internet address of the image communication apparatus, if communication is performed in the G3 FAX mode with the communication partner's apparatus, the image communication apparatus can notify the communication partner's apparatus of the possession of the Internet FAX function and the Internet FAX address of the image communication apparatus, and can receive image data from the communication partner's apparatus via Internet.

Second Embodiment

A second embodiment of the present invention will now be described with reference to the drawings.

The second embodiment is realized in the system shown in FIG. 1 which includes the Internet FAX apparatuses 1 and 2, the telephone network 3 to which these apparatuses are connected, and the network 4.

The Internet FAX apparatus of the second embodiment has the G3 FAX mode, and the simple mode, full mode and real time mode of Internet FAX.

The G3 FAX mode is the same as that described in the first embodiment.

The simple mode of Internet FAX (hereinafter abbreviated as the "simple mode") is the same as that in the first embodiment. In the Internet FAX modes (the simple Mode, full Mode, and real time mode), an image is transmitted/received via the Internet 4 in communication using the transmitter 1 and the receiver 2 shown in FIG. 1.

The full mode of Internet FAX (hereinafter abbreviated as the "full mode") will now be described.

In the full mode, image data having specifications superior to the A4 size, 200 dpi and the MH encoding method can be used as an additional file added to an E-mail, and the E-mail where the image data is added as a TIFF-format image file is transmitted. The receiver can notify the transmitter that the receiver has processed the E-mail.

An outline of the user's operation, the operation of the transmitter 1, and the operation of the receiver 2 in communication in the full mode will now be described.

The operator sets an original on the scanner unit 6 of the transmitter 1, and depresses an one-touch button on the operation unit 13.

The CPU 5 thereby reads address data from the RAM 12 in accordance with the address instructed through the one-touch button. The CPU 5 selects one of the G3 FAX mode and the three modes of Internet FAX for transmitting image data, based on information registered in the address data.

When the full mode has been selected, the CPU 5 reads the Internet address registered in the address data of the address instructed through the one-touch button from the RAM 12.

Then, the image of the original is read by the scanner unit 6 of the transmitter 1. The read image of the original is converted into image data by the CPU 5 according to the control program stored in the ROM 11.

It is assumed that the capability of the receiver 2 has been checked in advance by an E-mail for exchanging capability and is stored in address data.

The image data is converted into an additional file of the E-mail in accordance with the control program stored in the ROM 11.

Upon completion of conversion of the image data into the additional file, the Internet address read from the RAM 12 is set as the address for the E-mail. The E-mail where the additional file of the image data ia added is transmitted to the receiver 2 via Internet through Ethernet using SMTP which is a protocol for transmitting an E-mail.

The receiver 2 receives the E-mail according to the ordinary SMTP.

Upon reception of the E-mail, the receiver 2 detects if the additional file is added to the E-mail. When the additional file has been detected, then, it is determined if the additional file is image data.

If the result of the determination is affirmative, the additional file is converted into image data, which is transmitted to the printer in order to print an image represented by the image data.

The receiver 2 notifies the transmitter by the E-mail that the image data has been received and printed.

When the transmitter 1 has been notified by the E-mail from the receiver 2 that the image data has been received by the receiver 2 and an image represented by the image data has been printed, the transmitter 1 stores the fact that the transmission has been normally completed in a communication history file so as to be able to output a communication control report later.

A description will now be provided of the real time mode of Internet FAX (hereinafter abbreviated as the "real time mode").

The real time mode is a method conforming to the T30 procedure in which the frame of a T30 procedure signal is transmitted/received in the form of TCP packets, and image data is transmitted in the form of TCP packets.

An outline of the operator's operation, the operation of the transmitter 1, and the operation of the receiver 2 in communication in the real time mode will now be described.

The operator sets an original on the scanner unit 6 of the transmitter 1, and depresses an one-touch button on the operation unit 13.

The CPU 5 thereby reads address data from the RAM 12 in accordance with the address instructed through the one-touch button. The CPU 5 selects one of the G3 FAX mode and the three modes of Internet FAX for transmitting image data, based on information registered in the address data.

When the real time mode has been selected, the CPU 5 reads an Internet address registered in the address data of the address instructed through the one-touch button from the RAM 12.

Then, the image of the original is read by the scanner unit 6 of the transmitter 1. The read image of the original is converted into image data by the CPU 5 according to the control program (control software) stored in the ROM 11.

The transmitter 1 notifies the receiver 2 having the Internet address of the address instructed through the one-touch button of call-receiving in the real time mode using TCP packets.

Upon notification of call-receiving in the real time mode, the receiver 2 transmits a DIS frame in the form of TCP packets.

By receiving the DIS frame, the transmitter 1 can check the capability of the receiver 2.

The transmitter 1 transmits a DCS frame and image data in the form of TCP packets in accordance with the function of the receiver 2 notified by the received DIS frame. At that time, the image data is transmitted in the form of TCP packets formed by the CPU 5 according to the control program stored in the ROM 11 in accordance with the function of the receiver 2 notified in the received DIS frame.

Upon reception of the DCS frame and the image data in the form of TCP packets, the transmitter 1 prints an image represented by the image data in accordance with information in the received DCS frame.

After transmitting the image data, the transmitter 1 transmits an EPO frame in the form of TCP packets.

When the receiver 2 has received the EOP frame in the form of TCP packets, the receiver 2 transmits an MCF frame in the form of TCP packets in response to the reception.

The transmitter 1 which has received the MCF frame transmits a DCN frame in the form of TCP packets, and terminates the transmission in the real time mode.

Upon reception of the DCN frame in the form of TCP packets, the receiver 2 terminates reception in the real time mode.

The operation of the above-described Internet FAX apparatus operating in the G3 FAX mode, or one of the simple mode, full mode and real time mode of Internet FAX will now be described with reference to FIGS. 10-19.

Figure 13:
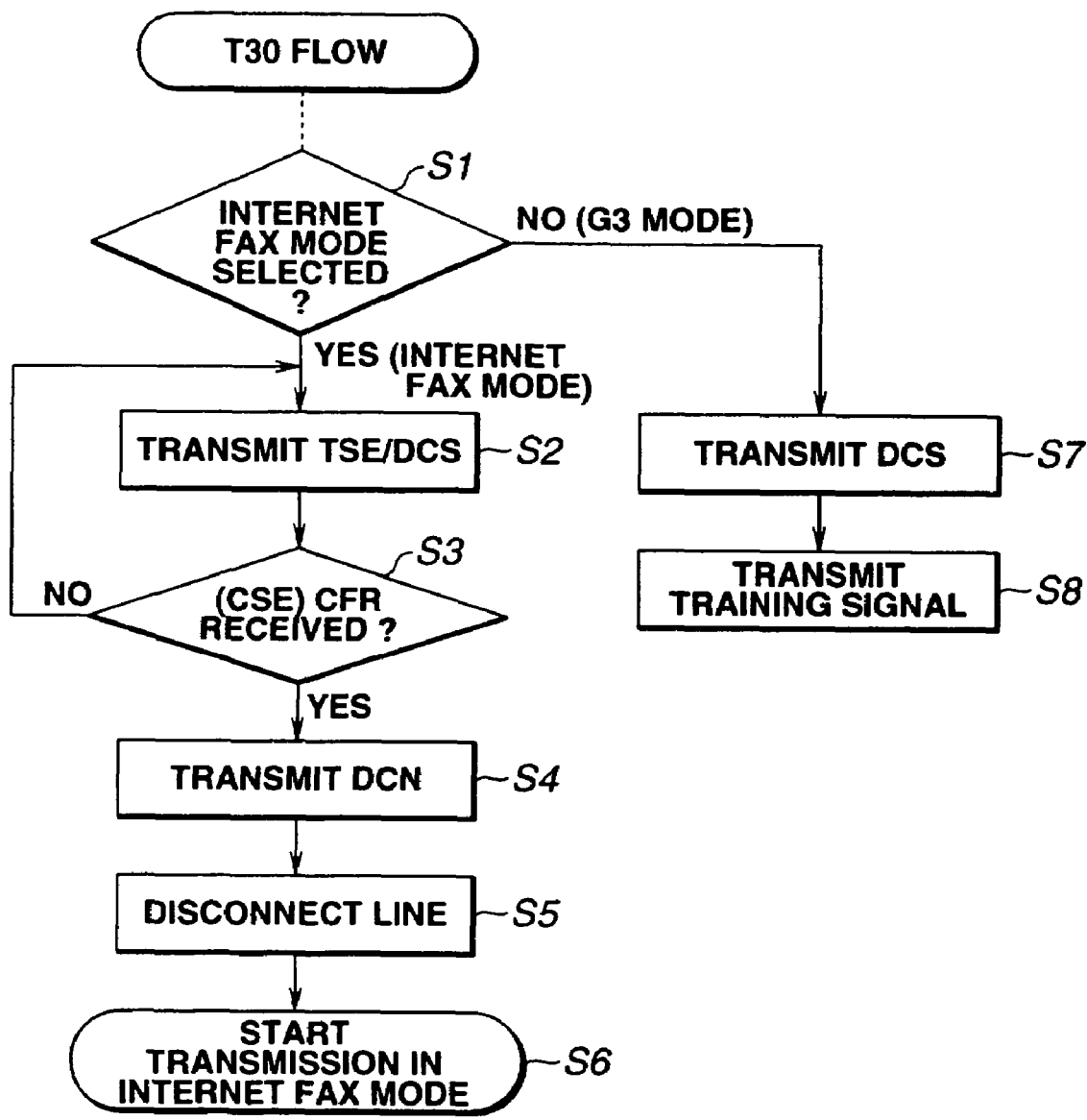
FIG. 13 is a flowchart illustrating a G3 transmission procedure in the second embodiment.
Figure 15:
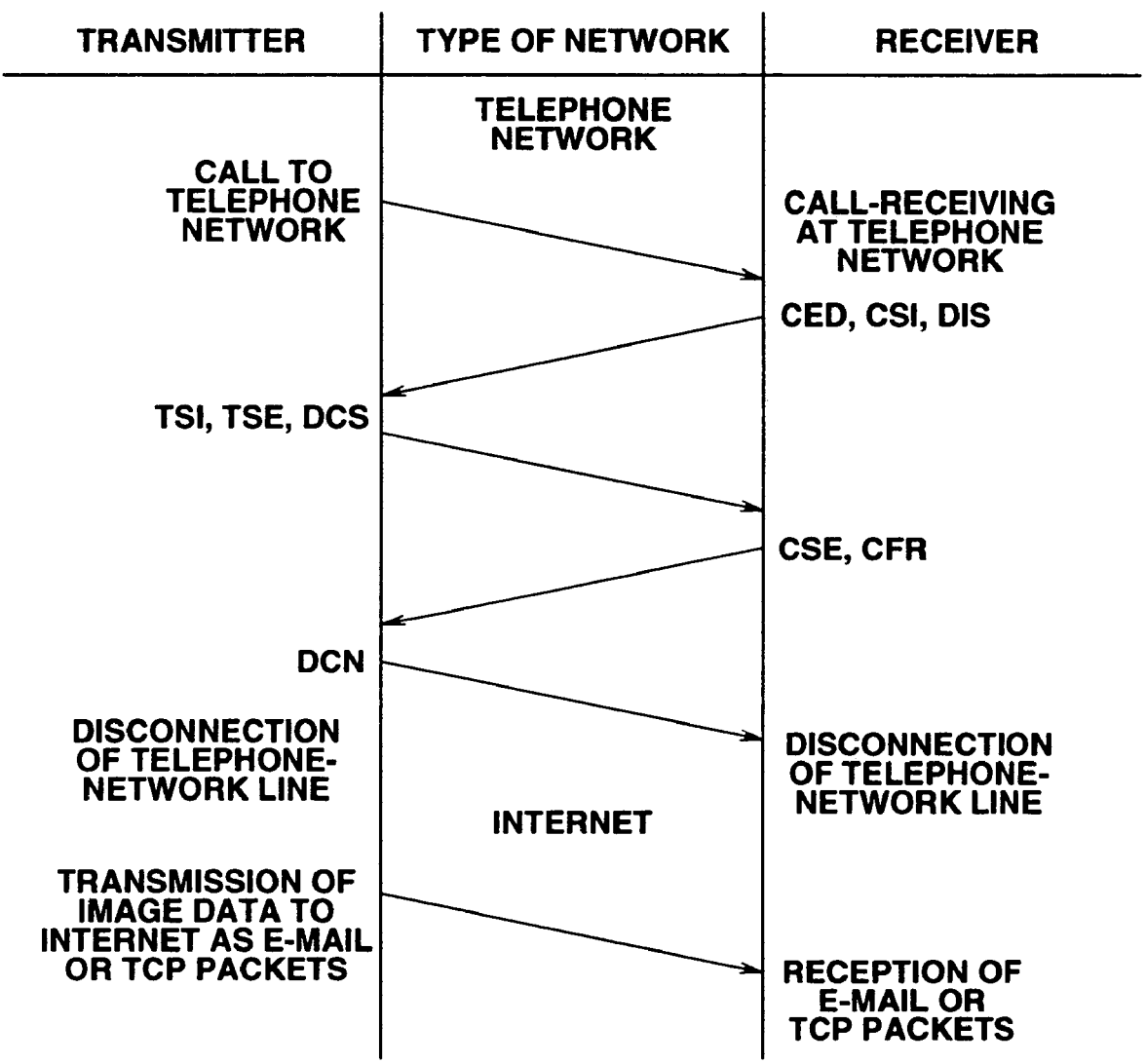
FIG. 15 is a diagram illustrating a protocol in the second embodiment.
Figure 16:
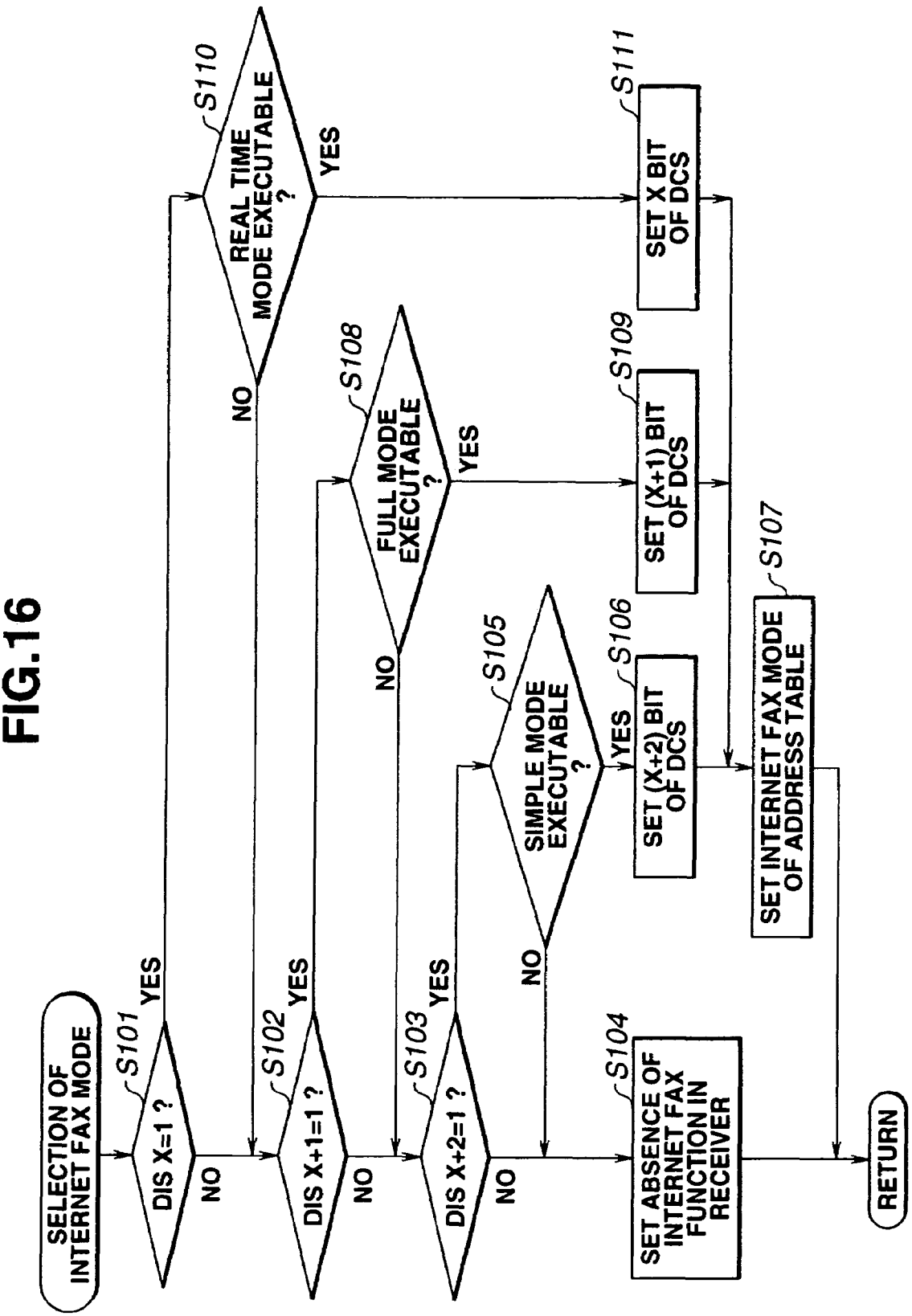
FIG. 16 is a flowchart illustrating selection of an Internet FAX mode in the second embodiment.
Figure 17:
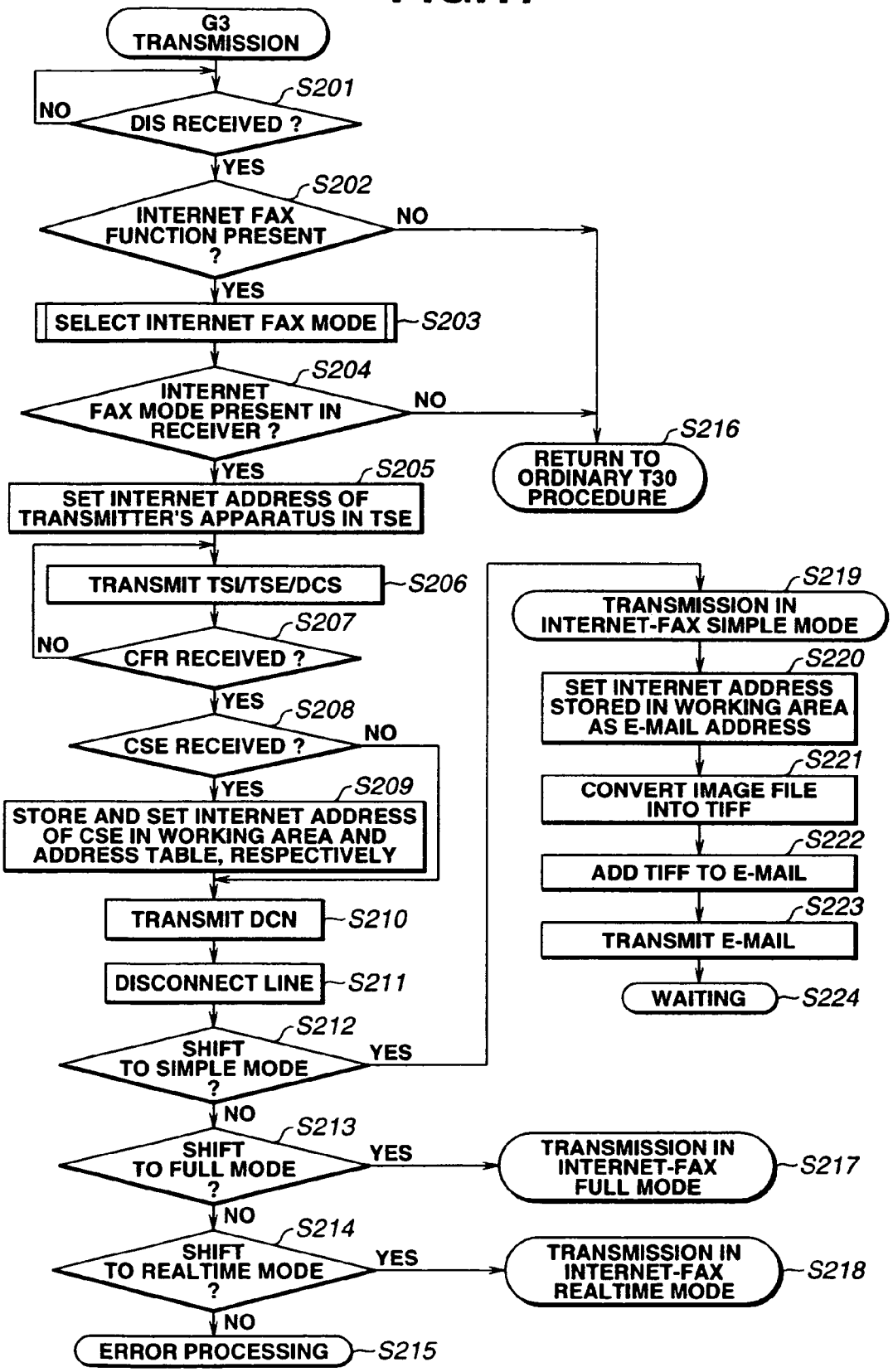
FIG. 17 is a flowchart illustrating Internet FAX transmission in the second embodiment.
Figure 18:
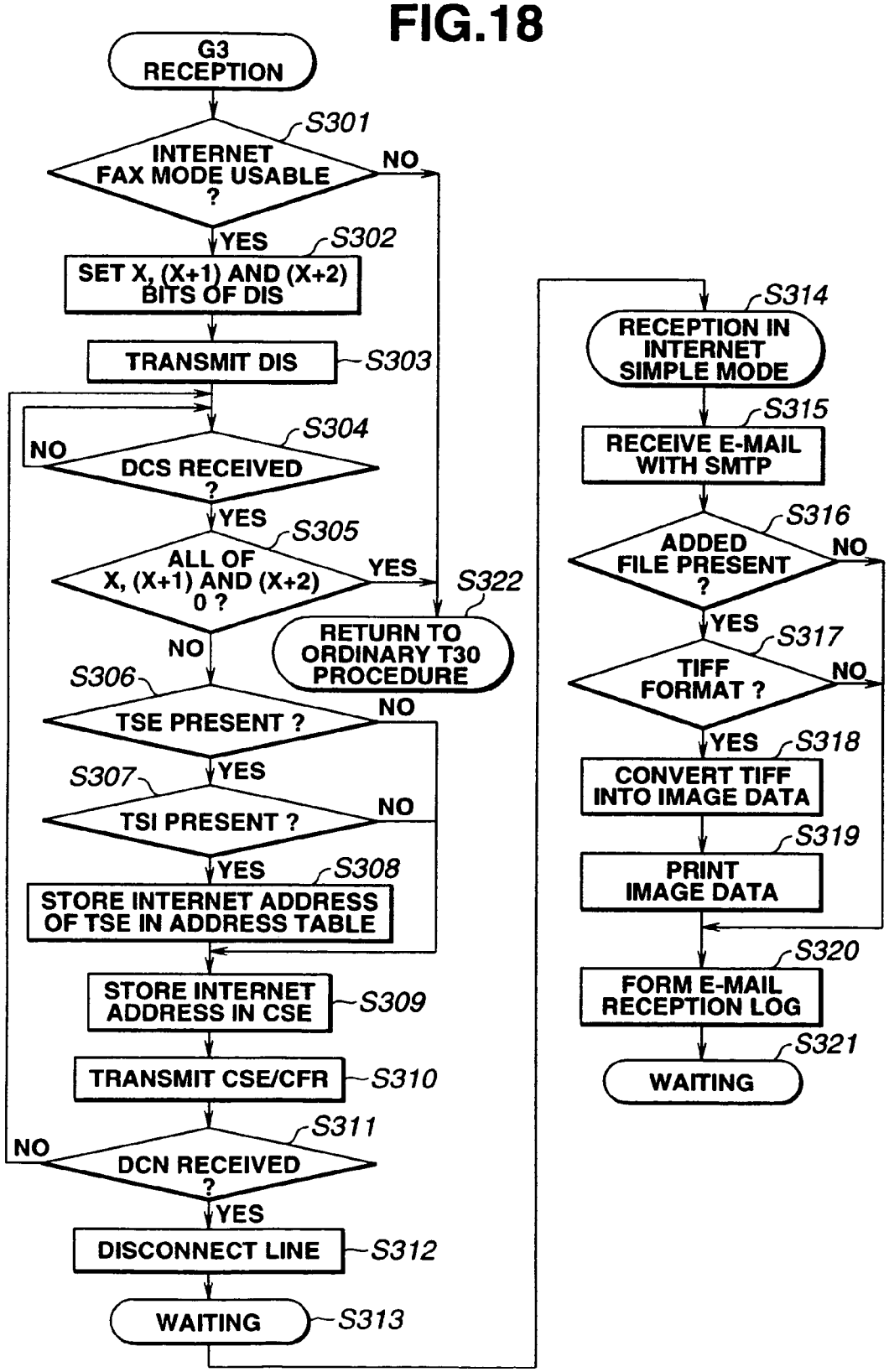
FIG. 18 is a flowchart illustrating Internet FAX reception in the second embodiment.

FIG. 10 is a diagram illustrating the format of a T30 DIS signal. FIG. 11 is a diagram illustrating the format of a T30 DCS signal. FIG. 12 is a diagram illustrating a T30 optional signal for notifying an Internet address. FIG. 13 is a flowchart illustrating a G3 transmission procedure. FIG. 14 is a diagram illustrating a format of address data. FIG. 15 is a diagram illustrating a protocol. FIG. 16 is a flowchart illustrating processing of selecting an Internet FAX mode. FIG. 17 is a flowchart illustrating the transmission operation of the Internet FAX apparatus. FIG. 18 is a flowchart illustrating the image receiving operation of the Internet FAX apparatus.

Figure 19:
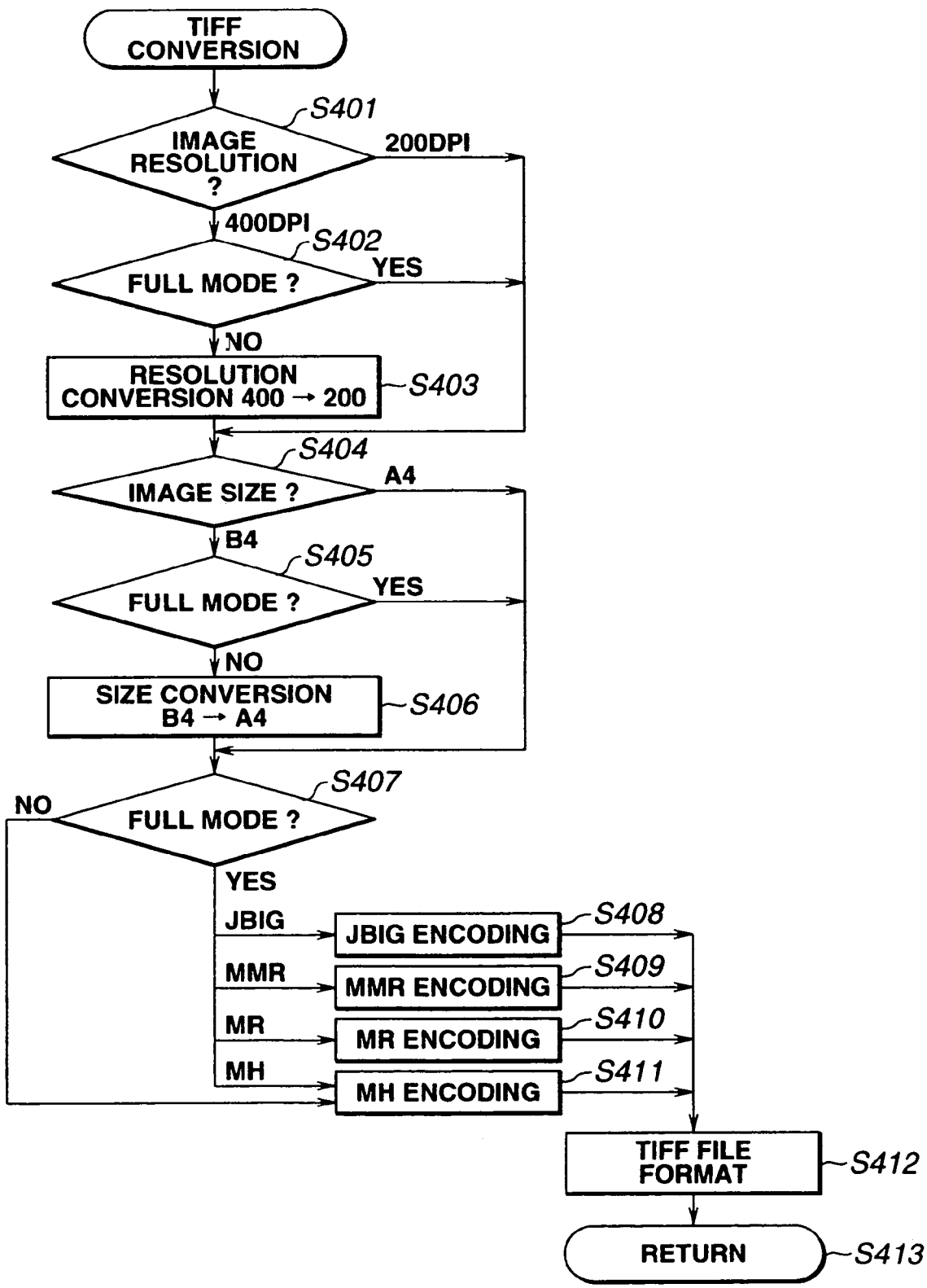
FIG. 19 is a flowchart illustrating TIFF conversion in the second embodiment.

FIG. 19 is a flowchart illustrating TIFF conversion. Since the transmitter 1 and the receiver 2 have the same configuration, the receiver 2 will be described using the block diagram of the transmitter 1.

The contents of a DIS signal proposed in the second embodiment will now be described with reference to FIG. 10.

FIG. 10 illustrates a bit indicating the Internet FAX capability of the DIS signal in the format of FIF. An octet (allocation of a bit of FIF) of the DIS signal is allocated according to ITU-T. In the second embodiment, it is assumed that a bit indicating the Internet FAX capabililty of the DIS signal is allocated to FIF of the DIS signal. A bit X indicates presence/absence of the simple mode, full mode or real time mode of Internet FAX. That is, as shown in FIG. 10, presence/absence of the simple mode, full mode and real time mode of Internet FAX is represented by the patterns of bits X, X+1 and X+2 of the DIS signal.

FIG. 11 illustrates a bit indicating the Internet FAX capability of the DCS signal in the format of FIF. An octet (allocation of a bit of FIF) of the DCS signal is allocated according to ITU-T. In the second embodiment, it is assumed that a bit instructing to perform communication by switching the communication mode to one of the simple mode, full mode and real time mode of Internet FAX is allocated to FIF of the DCS signal. A bit X indicates a bit for providing the receiver with instruction indicating with which one of the simple mode, full mode and real time mode of Internet FAX communication is to be performed.

It is assumed that, when bits indicating presence/absence of the simple mode, full mode and real time mode of Internet FAX is officially recommended by ITU-T, these bits X, X+1, X+2 correspond to the recommended bits.

FIG. 12 is a diagram illustrating an optional signal for notifying an Internet address according to the T30 recommendation proposed in the second embodiment.

Conventionally, CSI, CIG and TSI signals are used as optional signals, each for notifying a telephone number, in the T30 procedure. In the second embodiment, CSE, CIE and TSE signals corresponding to the CSI, CIG and TSI signals, respectively, are newly proposed and used as signals, each for notifying an Internet address. An Internet address is stored in FIF of each of the CSE, CIE and TSE signals.

As the CSI signal for transmitting a telephone number, the CSE signal, serving as an optional signal, is transmitted while storing the Internet address of the receiver in FIF of the frame. The timing of transmission of the CSE signal according to the T30 procedure is the same as the timing for the CSI signal.

As the CIG signal for transmitting a telephone number, the CIE signal, serving as an optional signal, is transmitted while storing the Internet address of the poling requesting apparatus in FIF of the frame. The timing of transmission of the CIE signal according to the T30 procedure is the same as the timing for the CIG signal.

As the TSI signal for transmitting a telephone number, the TSE signal, serving as an optional signal, is transmitted while storing the Internet address of the transmitter in FIF of the frame. The timing of transmission of the TSE signal according to the T30 procedure is the same as the timing for the TSI signal.

The manner of transmitting/receiving a signal in the G3 FAX mode in the second embodiment will now be desribed with reference to FIG. 15. Since this processing is basically according to the known T30 procedure, only difference from the known T30 procedure will be described.

First, the transmitter 1 calls the receiver 2 via the telephone network.

The receiver 2 which has receives the call from the telephone network connects the line to the telephone network, and sets and transmits the X, X+1 or X+2 bit of DIS signal in accordance with the Internet FAX capability of the receiver's apparatus.

Upon reception of the DIS signal from the receiver 2, the transmitter 1 determines if the simple mode, full mode or real time mode of Internet FAX mode is present in the receiver 2 according to the X, X+1 or X+2 bit of the DIS signal. If it has been determined that the receiver 2 has at least one of the Internet FAX modes, the communication mode is determined according to the flowchart for selecting the communication mode shown in FIG. 16 (to be described in detail later). When one of the Internet FAX modes has been selected, a bit indicating to which of the Internet FAX modes the communication mode is to be switched is set in the X, X+1 or X+2 bit of the DCS signal, the Internet address of the transmitter 1 is set in the optional frame TSE, and the resultant signal is transmitted.

Upon reception of the DSC signal, the receiver 2 determines if shift to one of the Internet FAX modes is instructed according to the X, X+1 or X+2 bit of the DCS signal. If the result of the determination is affirmative, a CFR signal is transmitted, the Internet address of the receiver's apparatus is stored in the optional frame CSE, and the resultant signal is transmitted.

Upon reception of the CFR signal after transmitting the DCS signal, the transmitter 1 transmits a DCN signal in order to shift to the Internet FAX mode, and terminates the communication via the telephone network by disconnecting the line.

The receiver 2 disconnects the line upon reception of the DCN signal.

Then, the transmitter 1 shifts to the Internet FAX mode, and transmits an E-mail where an image data file in the form of TIFF is added in the case of the simple mode or full mode, and transmits a T30 procedure signal and image data in the form of TCP packets in the case of the real time mode.

The receiver 2 converts the image data file added to the E-mail received via Internet, or the image data received in the form of TCP packets into printing data, and records an image represented by the image data on a recording sheet.

FIG. 13 is a flowchart illustrating an outline of the transmission operation in the G3 FAX mode in the transmitter 1. FIG. 13 illustrates state transition of the transmitter 1, and the actual flow executed by the CPU during transmission is shown in FIG. 17. The flowchart shown in FIG. 17 will be described later.

In FIG. 13, in step S1, it is determined if an Internet FAX mode (to be described with reference to FIG. 16) has been selected.

If the result of the determination in step S1 is affirmative, the process proceeds to step S2, where TSE and DCS signals are transmitted. The DCS signal transmitted in step S2 indicates switching to one of the simple mode, full mode and real time mode.

In step S3, it is determined if a CFR signal has been received. When an optional frame CSE has been received in step S3, the Internet address of the CSE frame is stored in the address table.

When a CFR signal has been received in step S3, the process proceeds to step S4, where a DCN signal is transmitted. Then, in step S5, the line is disconnected. Then, in step S6, transmission is started in the Internet FAX mode.

If the result of the determination in step S1 is negative, i.e., when the G3 FAX mode has been selected, the process proceeds to step S7, where a DCS signal which does not indicate switching to the Internet FAX mode is transmitted. Then, in step S8, a training signal is transmitted. Thereafter, image transmission is performed according to the ordinary T30 procedure.

Next, an outline of the receiving operation in the G3 mode in the second embodiment will be described.

This operation is performed basically according to the known T30 procedure. Hence, only portions which are features of the second embodiment will be described.

When transmitting a DIS signal, the X, X+1 and X+2 bits of the DIS signal shown in FIG. 10 are transmitted in accordance with the Internet FAX capability of the receiver's apparatus. Upon reception of a DCS signal transmitted from the transmitter 1, it is determined if an instruction to shift to an Internet FAX mode is provided in the received DCS signal based on the X, X+1 and X+2 bits shown in FIG. 11. If the result of the determination is affirmative, the Internet address of the receiver's apparatus is stored in the optional frame CSE. Then, CSE and CFR signals are transmitted, and the line is disconnected by receiving a DCN signal from the transmitter 1. Then, image data is received in the Internet FAX mode indicated by the DCS signal. If the result of the determination is negative, a CFR signal is transmitted, and ordinary G3 reception is performed. The Internet address in the optional frame TSE received together with the DCS signal is stored in the address table.

FIG. 14 illustrates a format of address data. Each of the address data is provided for the corresponding one of each of a plurality of one-touch dials or abbreviation dials, and an address table including a plurality of address data is stored in the RAM 12 shown in FIG. 1. One-touch-dial numbers and abbreviation-dial numbers are generically termed "one-touch numbers".

In FIG. 14, presence/absence of the G3 FAX mode (G3 FAX function), the telephone number, presence/absence and, in the case of the presence, the name of an Internet FAX mode (Internet FAX function), the Internet address, and abbreviation of the receiver for each one-touch number are stored in the RAM 12.

In the Internet FAX apparatus of the second embodiment, when a one-touch button has been depressed on the operation unit 13, the CPU 5 reads information relating to address data of the corresponding one-touch number (presence/absence of the G3 FAX function, the telephone number, presence/absence of each Internet FAX mode, the Internet address, and abbreviation of the communication partner) from the address table stored in the RAM 12.

Processing of selecting an Internet FAX mode will now be described with reference to the flowchart shown in FIG. 16.

The flowchart shown in FIG. 16 is a program stored in the ROM 11, and is executed by the CPU 5. The flowchart shown in FIG. 16 is a subroutine called from step S203 shown in FIG. 17, in which a mode is selected according to a predetermined priority, as follows.

In step S101, it is determined if the real time mode of Internet FAX is present, based on a DIS signal from the receiver. If the result of the determination in step S101 is affirmative, the process proceeds to step S110, where it is determined if the transmitter's apparatus can execute the real time mode. If the result of the determination in step S110 is affirmative, the process proceeds to step S111, where the real time mode represented by the X bit of the DCS signal is set.

In step S102, it is determined if the full mode of Internet FAX is present, based on the DIS signal from the receiver. If the result of the determination in step S102 is affirmative, the process proceeds to step S108, where it is determined if the full mode can be executed in the transmitter's apparatus. If the result of the determination in step S108 is affirmative, the process proceeds to step S109, where the full mode represented by the X+1 bit of the DSC signal is set.

In step S103, it is determined if the simple mode of Internet FAX is present based on the DIS signal from the receiver. If the result of the determination in step S103 is affirmative, the process proceeds to step S105, where it is determined if the simple mode can be executed by the transmitter's apparatus. If the result of the determination in step S105 is affirmative, the process proceeds to step S106, where the simple mode represented by the X+2 bit of the DCS signal is set.

In step S107, the selected Internet FAX mode of the address data corresponding to the assigned one-touch number is set.

When all of the X, X+1 and X+2 bits in the DIS signal equal 0, then, in step S104, absence of the Internet FAX function is set in the DCS signal.

FIG. 17 is a flowchart illustrating the image transmission operation at the transmission-side Internet FAX apparatus. The flowchart shown in FIG. 17 is a program stored in the ROM 11 and executed by the CPU 5.

When the operator has set an original and depressed a one-touch dial button on the operation unit 13, information relating to the one-touch number corresponding to the depressed button (presence/absence of the G3 FAX function, the telephone number, presence/absence of the function of each Internet FAX mode, the Internet address, and abbreviation of the communication partner) is read. It is assumed that a one-touch button 01 has been depressed on the operation unit 13.

The address shown 01 in FIG. 14 is checked, and the address 01 determined not to have the Internet FAX capability is called through the telephone network, and transmission in the G3 mode is started.

In step S201, it is determined if a DIS signal has been received from the receiver 2. If the result of the determination in step S201 is affirmative, the process proceeds to step S202, where it is determined if the transmitter's apparatus has the Internet FAX function and therefore can perform communication in an Internet FAX mode.

If the result of the determination in step S202 is affirmative, the process proceeds to step S203, where the processing of selecting an Internet FAX mode shown in FIG. 16 is called, and presence/absence of an Internet FAX mode in the received DIS signal is checked.

In step S204, it is determined if the receiver 2 has an Internet FAX mode. If the result of the determination in step S204 is affirmative, the process proceeds to step S205.

If the result of the determination in step S202 or S204 is negative, the process proceeds to step S206, where image data is transmitted according to the ordinary T30 procedure.

In step S205, the Internet address of the transmitter's apparatus is set in a TSE frame.

In step S206, TSE and DCS signals are transmitted. Then, in step S207, it is determined if a CFR signal has been detected.

If the result of the determination in step S207 is affirmative, the process proceeds to step S208, where it is determined if a CSE signal has been detected together with the CFR signal. If the result of the determination in step S208 is affirmative, the process proceeds to step S209, where the Internet address in FIF of the CSE frame is stored in a working area, and is set in the Internet-address column of the corresponding one-touch number in the address table.

In step S210, a DCN signal is transmitted. Then, in step S211, the line is disconnected.

In step S212, it is determined if the DCN signal instructing shift to the simple mode which has been transmitted in step S206 has been received. If the result of the determination in step S212 is affirmative, the process proceeds to step S219, where transmission processing in the simple mode of Internet FAX is performed.

In step S213, it is determined if the DCS signal instructing shift to the full mode which has been transmitted in step S206 has been received. If the result of the determination in step S213 is affirmative, the process proceeds to step S217, where transmission processing in the full mode of Internet FAX is performed.

In step S214, it is determined if the DCS signal instructing shift to the real time mode which has been transmitted in step S206 has been received. If the result of the determination in step S214 is affirmative, the process proceeds to step S218, where transmission processing in the real time mode of Internet FAX is performed.

Processing from step S219 to step S224 is performed when the mode shifts to the simple mode.

In step S219, transmission processing in the simple mode of Internet FAX is started.

In step S220, the Internet address stored in the working area in the processing of step S209 is set as the address for the E-mail.

In step S221, the image file is converted into TIFF. At that time, the image to be transmitted is converted into a format of the A4 size, 200 dpi and the MH encoding method so as to conform to the specifications of the simple mode.

In step S222, the TIFF image file is added to the E-mail. Then, in step S223, the E-mail is transmitted according to SMTP. Then, in step S224, the process returns to a waiting state.

Processing in the full mode in step S217 is similar to the processing in the simple mode in step S219. The processing in the full mode differs from the processing in the simple mode in that, when converting image data into a TIFF file, a function seperior to the function of the A4 size, 200 dpi and the MH encoding method can be selected.

FIG. 19 is a flowchart for TIFF conversion in the full mode. The detail of this flowchart will be describe later.

Processing in the real time mode in step S218 is a method according to a T30 procedure in which a T30 procedure signal and image data are transmitted in the form of TCP packets. Since this processing has already been described, further description thereof will be omitted.

The flow at the reception-side Internet FAX apparatus will now be described with reference to FIG. 18. The flowchart shown in FIG. 18 is a program stored in the ROM 11 and executed by the CPU 5 when the Internet FAX apparatus operates as a reception-side apparatus.

When there is a call from the telephone network, the NCU 9 performs call-receiving processing, and an automatic reception procedure in the G3 FAX mode is started.

In step S301, it is determined if the Internet FAX mode of the receiver's apparatus is set to be usable. If the result of the determination in step S301 is affirmative, the process proceeds to step S302. If the result of the determination in step S301 is negative, the process returns to the ordinary T30 procedure in step S322.

In step S302, the X, X+1 and X+2 bits of the DIS signal are set in accordance with the setting of the Internet FAX function of the receiver's apparatus. Then, in step S303, a DIS signal is transmitted.

In step S304, it is determined if a DCS signal has been received. If the result of the determination in step S304 is affirmative, the process proceeds to step S305, where it is determined if all of the X, X+1 and X+2 bits of the DCS signal equal 0. If the result of the determination in step S305 is affirmative, the process returns to the ordinary T30 procedure in step S322.

In step S306, it is determined if a TSE signal has been received. If the result of the determination in step S306 is affirmative, the process proceeds to step S307, where it is determined if a TSI signal has been received. If the result of the determination in step S307 is affirmative, the process proceeds to step S308, where the Internet address in the TSE signal is stored in the column of the Internet address of address data corresponding to the telephone number in the TSI signal. If the result of the determination in step S306 or S307 is negative, the process proceeds to step S309.

In step S309, the Internet address of the receiver's own apparatus is stored in a CSE signal. In step S310, CSE and CFR signals are transmitted. Then, in step S311, it is determined if a DCN signal has been received. If the result of the determination in step S311 is negative, the process returns to step S304.

If the result of the determination in step S311 is affirmative, the process proceeds to step S312, where the NCU 9 disconnects the line. Then, the process returns to the waiting state in step S313.

When the process has returned to the waiting state in step S313, image data is transmitted from the transmitter's apparatus in the Internet FAX mode, and the process proceeds to step S315, where reception in the Internet FAX mode is started. Processing from step S314 to step S321 will now be described assuming that image data has been transmitted in the simple mode.

In step S315, reception of the E-mail is performed with SMTP.

In step S316, it is determined if an additional file is present in the E-mail. If the result of the determination in step S316 is affirmative, the process proceeds to step S317, where it is determined if the additional file is a TIFF file.

If the result of the determination in step S317 is affirmative, the process proceeds to step S318. If the result of the determination in step S316 or S317 is negative, the process proceeds to step S320.

In step S318, the TIFF file is converted into image data. In step S319, an image represented by the image data is printed by the printer.

In step S320, an E-mail reception log is formed. Then, the process returns to the waiting state in step S321.

In the foregoing description, reception in the simple mode is started in step S314. Even when reception is started in the full mode, the same processing from step S314 to step S321 is performed. In this case, however, as for specifications for the size (A4 size or B4 size), the pixel density (200 dpi or 400 dpi) and the encoding method (MH, MR, MMR or JBIG), the TIFF file in step S318 has specifications superior to the specifications of the A4 size, 200 dpi and the MH encoding in the simple mode.

When reception is started in the real time mode in step S314 instead of the simple mode, a T30 procedure signal is transmitted/received in the form of TCP packets, and image data is received in the form of TCP packets.

The flow of TIFF conversion will now be described with reference to FIG. 19. The flowchart shown in FIG. 19 is a program stored in the ROM 11 and executed by the CPU 5.

First, in step S401, the resolution of the image to be transmitted is checked. If the resolution is 400 dpi, the process proceeds to step S402. If the resolution is 200 dpi, the process proceeds to step S404.

In step S402, it is determined if image data is to be transmitted in the full mode. If the result of the determination in step S402 is affirmative, the process proceeds to step S404. If the result of the determination in step S402 is negative, i.e., if the image data is to be transmitted in the simple mode, the process proceeds to step S403, where the resolution conversion into 200 dpi is performed.

In step S404, the size of the image to be transmitted is checked. If the size is B4, the process proceeds to step S405. If the size is A4, the process proceeds to step S407.

In step S405, it is determined if image data is to be transmitted in the full mode. If the result of the determination in step S405 is affirmative, the process proceeds to step S407. If the result of the determination in step S405 is negative, i.e., if the image data is to be transmitted in the simple mode, the process proceeds to step S406, where the size is converted into A4.

In step S407, it is determined if the image data is to be transmitted in the full mode. If the result of the determination in step S407 is affirmative, encoding is performed according to the JBIG, MMR, MR or MH method (step S408, S409, S410 or S411, respectively), depending on the condition.

If the result of the determination in step S407 is negative, i.e., if the image data is to be transmitted in the Simple Mode, the process proceeds to step S412, where the MH encoding is performed.

In step S412, image data encoded in each of steps S408-S411 is converted into a file in the form of TIFF.

As described above, in the second embodiment, the Internet FAX function of the receiver is notified to the transmitter with a DIS signal, and the Internet address of the receiver is transmitted with an optional CSE signal. The transmitter instructs communication in the Internet FAX mode with a DCS signal, interrupts the G3 FAX mode, and execute communication in the Internet FAX mode. Hence, it is possible to transmit image data using one of the real time mode, full mode or simple mode of Internet FAX adjusted to the function of the receiver via Internet.

Modification of the Second Embodiment

In the above-described second embodiment, the mode is switched to the Internet FAX mode by interrupting the T30 procedure. However, it is also possible to transmit image data in the G3 FAX mode at the first communication operation with a communication partner, and transmit image data at subsequent communication operations by directly selecting the Internet FAX mode using the same one-touch number.

It is determined that the current communication operation with an address in the Internet FAX mode is the first communication operation when the Internet FAX function is absent as in the case of the one-touch number 01 shown in FIG. 14, when the Internet FAX address is not stored, or when at least one of the above-described conditions is satisfied.

In the first communication operation with a communication partner, the G3 FAX transmission mode is selected according to the determination shown in FIG. 16 in the second embodiment.

The flow shown in FIG. 17 for the second embodiment differs for the modification in the first communication operation. Only difference from the second embodiment will now be described, and description for the same processing will be omitted.

After NO in step S208 or after execution of step S209 shown in FIG. 17, ordinary T30 image data transmission is performed (image data is transmitted after trasmitting a training/TCF signal and receiving a CFR signal from the receiver 2). After transmitting image data for all pages in that communication operation, an ordinary T30 EOM signal is transmitted. Then, the process proceeds to step S210, where a DCN signal is transmitted. Then, the first communication operation with the communication partner is terminated.

In each of subsequent communication operations with the communication partner, address data of the address in the one-touch address table is read. Then, in the selection of an Internet FAX mode shown in FIG. 16, one of Internet FAX modes is selected in accordance with information relating to the Internet FAX function of the address data. Then, image data is transmitted via Internet according to the processing from step S219 to step S224 shown in FIG. 17.

It is also possible to transmit image data stored in the memory during memory transmission in the Internet FAX mode as in the second embodiment.

When performing a call using a ten-digit key dial instead of a one-touch key, it is also possible to transmit image data in the Internet FAX mode as in the second embodiment by storing the FAX function of the receiver received in the G3 FAX mode together with the telephone number called using the ten-digit key dial in a working area of the RAM 12.

According to the second embodiment, in an image communication apparatus and method having a plurality of Internet FAX modes and the G3 FAX mode, the Internet FAX function of the communication partner's apparatus is detected during communication in the G3 FAX mode, and the image communication apparatus shifts to communication in the Internet FAX mode by disconnecting communication in the G3 FAX mode based on detection of the Internet FAX function of the communication partner's apparatus. Thus, the image communication apparatus shifts to the Internet FAX mode requiring no communication fee after knowing the Internet FAX mode of the communication partner's apparatus in communication in the G3 FAX mode. As a result, it is possible to reduce the communication cost, and transmit optimum image data in accordance with the Internet FAX function of the communication partner's apparatus.

Furthermore, the Internet FAX mode of the communication partner's apparatus is detected during communication in the G3 FAX mode, and an image is transmitted in the Internet FAX mode in accordance with the detected mode of the communication partner's apparatus. Hence, it is possible to detect the Internet FAX mode of the communication partner's apparatus in the G3 FAX mode even if the Internet FAX mode of the communication partner's apparatus is unknown, and to transmit optimum image data in accordance with the Internet FAX mode of the communication partner's apparatus.

According to the second embodiment, the detected Internet FAX mode of the communication partner's apparatus is stored, and image data is transmitted in the Internet FAX mode in accordance with the stored Internet FAX mode of the communication partner's apparatus. Hence, when the function of the communication partner's apparatus is stored, it is possible to start to transmit image data in an optimum mode adjusted to the Internet FAX mode of the communication partner's apparatus in the Internet FAX mode without performing communication in the G3 FAX mode, and therefore to start communication of image data earlier by an amount of omitting communication in the G3 FAX mode for detecting the Internet FAX mode of the communication partner's apparatus, and to reduce the communication fee.

According to the second embodiment, in an image communication apparatus and method having a plurality of Internet FAX modes and the G3 FAX mode, the apparatus notifies the communication partner's apparatus of the Internet FAX mode of the image communication apparatus and the Internet FAX address during communication in the G3 FAX mode. Hence, even when the communication partner's apparatus does not know the Internet FAX mode and the Internet address of the image communication apparatus, if communication is performed in the G3 FAX mode with the communication partner's apparatus, the image communication apparatus can notify the communication partner's apparatus of the Internet FAX mode and the Internet FAX address of the image communication apparatus, and can receive image data from the communication partner's apparatus via Internet.

The individual components desiganated by blocks in the drawings are all well known in the image communication apparatus and method arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image communication method that utilizes a plurality of Internet facsimile modes and a G3 facsimile mode, said method comprising the steps of:

detecting an Internet facsimile mode, which a destination apparatus of image data has, from the plurality of Internet facsimile modes during communication in the G3 facsimile mode, in accordance with a first procedure signal of the G3 facsimile mode from the destination apparatus;

selecting an Internet facsimile mode for communicating with the destination apparatus from the plurality of Internet facsimile modes based on the detected Internet facsimile mode;

directing the destination apparatus to switch to the selected Internet facsimile mode; and transmitting an image to the destination apparatus based on the directed Internet facsimile mode, wherein, when shifting to the Internet facsimile mode, one of a simple mode, a full mode and a real time mode is selected from among the plurality of the Internet facsimile modes possessed by the destination apparatus according to predetermined priority, and communication in the selected Internet facsimile mode is performed, and wherein selection is performed in order of the real time mode, the full mode, and the simple mode.

2. An image communication method according to claim 1, wherein the detected Internet facsimile mode of the destination apparatus is stored, and wherein image data is transmitted in accordance with the stored Internet facsimile mode of the destination apparatus.

3. An image communication method according to claim 2, further comprising the step of determining whether or not the communication is a first communication operation with the destination apparatus in the Internet facsimile mode, wherein image data is transmitted in the G3 facsimile mode in a first communication operation, based on a determination that the communication with the destination apparatus is the first communication operation, and wherein image data is transmitted in the Internet facsimile mode of the destination apparatus, based on a determination that the communication with the destination apparatus is not a first communication operation.

4. An image communication method according to claim 1, wherein, when the simple mode or the full mode of Internet facsimile mode has been selected, an Internet facsimile communication apparatus is caused to transmit an E-mail in which an image file formed in accordance with the selected mode is added.

5. An image communication method according to claim 4, wherein the image file comprises a TIFF file, and wherein an Internet address comprises an E-mail address.

6. An image communication method according to claim 1, wherein, when the real time mode has been selected, an Internet facsimile communication apparatus is caused to convert a procedure signal and image data into TCP packets, transmit the TCP packets according to a T30 facsimile procedure, and convert TCP packets received from the destination apparatus into a T30 frame.

7. An image communication apparatus that utilizes a plurality of Internet facsimile modes and a G3 facsimile mode, said apparatus comprising:
　a detection unit adapted to detect an Internet facsimile mode, which a destination apparatus of image data has, from the plurality of Internet facsimile modes during communication in the G3 facsimile mode, in accordance with a first procedure signal of the G3 facsimile mode from the destination apparatus;
　a selection unit adapted to select an Internet facsimile mode for communicating with the destination apparatus based on the Internet facsimile mode detected by said detection unit;
　a direction unit adapted to direct the destination apparatus to switch to the Internet facsimile mode selected by said selection unit; and
　a transmission unit adapted to transmit an image based on the Internet facsimile mode selected by said selection unit,
　wherein, when shifting to the Internet facsimile mode, one of a simple mode, a full mode and a real time mode is selected from among the plurality of the Internet facsimile modes possessed by the destination apparatus according to predetermined priority, and communication in the selected Internet facsimile mode is performed, and
　wherein selection is performed in order of the real time mode, the full mode, and the simple mode.

8. An image communication method according to claim 1, further comprising the step of determining an address of the Internet facsimile mode of the destination apparatus in accordance with a second procedure signal of the G3 facsimile mode.

* * * * *